United States Patent
Kupe et al.

(10) Patent No.: US 8,037,674 B2
(45) Date of Patent: Oct. 18, 2011

(54) SYSTEM AND METHOD OF NO$_x$ ABATEMENT

(75) Inventors: Joachim Kupe, Davisburg, MI (US); James Zizelman, Honeoye Falls, NY (US); Jean J. Botti, Rochester Hills, MI (US); Haskell Simpkins, Grand Blanc, MI (US); Mark D. Hemingway, Columbiaville, MI (US); William J. LaBarge, Bay City, MI (US); Thomas W. Silvis, Flushing, MI (US); John E. Kirwan, Troy, MI (US); Joseph V. Bonadies, Clarkston, MI (US); Kenneth Price, Brighton, MI (US)

(73) Assignee: Delphi Technologies, Inc., Troy, MI (US)

( * ) Notice: Subject to any disclaimer, the term of this patent is extended or adjusted under 35 U.S.C. 154(b) by 1314 days.

(21) Appl. No.: 10/541,654

(22) PCT Filed: Feb. 11, 2004

(86) PCT No.: PCT/US2004/004093
§ 371 (c)(1), (2), (4) Date: Jul. 7, 2005

(87) PCT Pub. No.: WO2004/071646
PCT Pub. Date: Aug. 26, 2004

(65) Prior Publication Data
US 2006/0213187 A1     Sep. 28, 2006

(51) Int. Cl.
*F01N 3/00*     (2006.01)

(52) U.S. Cl. .................. 60/286; 60/295; 60/297; 60/303

(58) Field of Classification Search .................... 60/274, 60/286, 295, 297, 301, 303
See application file for complete search history.

(56) References Cited

U.S. PATENT DOCUMENTS

| | | | | |
|---|---|---|---|---|
| 6,109,024 A * | 8/2000 | Kinugasa et al. | ............... | 60/285 |
| 6,182,443 B1 * | 2/2001 | Jarvis et al. | .................... | 60/274 |
| 6,293,096 B1 * | 9/2001 | Khair et al. | .................... | 60/286 |
| 6,696,031 B1 * | 2/2004 | Twigg et al. | .................. | 423/212 |
| 6,739,125 B1 * | 5/2004 | Mulligan | ........................ | 60/286 |
| 6,820,414 B2 * | 11/2004 | Stroia et al. | .................... | 60/286 |
| 6,823,663 B2 * | 11/2004 | Hammerle et al. | ............. | 60/274 |

(Continued)

FOREIGN PATENT DOCUMENTS

DE     19510804     9/1996

(Continued)

OTHER PUBLICATIONS

PCT International Search Report dated Jul. 16, 2004.

(Continued)

*Primary Examiner* — Tu Nguyen
(74) *Attorney, Agent, or Firm* — Thomas N. Twomey

(57) ABSTRACT

A NOX abatement system includes a first NOX adsorber capable of being disposed in-line and downstream of and in fluid communication with an engine. The NOX abatement system further includes a selective catalytic reduction catalyst disposed in-line and downstream of, and in direct fluid communication with, the first NOX adsorber. The selective catalytic reduction catalyst is capable of storing ammonia. An off-line reformer is disposed in selective communication with and upstream of the first NOX adsorber and the selective catalytic reduction catalyst. The reformer is capable of producing a reformate that includes primarily hydrogen and carbon monoxide.

1 Claim, 5 Drawing Sheets

U.S. PATENT DOCUMENTS

| | | |
|---|---|---|
| 6,832,473 B2 * 12/2004 | Kupe et al. | 60/286 |
| 6,877,313 B1 * 4/2005 | Phillips et al. | 60/297 |
| 7,188,469 B2 * 3/2007 | Bonadies et al. | 60/286 |
| 7,254,939 B2 * 8/2007 | Duvinage et al. | 60/286 |
| 7,332,135 B2 * 2/2008 | Gandhi et al. | 422/177 |
| 2002/0073692 A1 6/2002 | Katashiba et al. | |

FOREIGN PATENT DOCUMENTS

| | | |
|---|---|---|
| EP | 0773354 | 5/1997 |
| EP | 1023935 | 8/2000 |
| JP | 3194111 | 8/1991 |
| WO | 0076637 | 12/2000 |
| WO | 0114698 | 3/2001 |
| WO | 02094420 | 11/2002 |
| WO | 02100519 | 12/2002 |
| WO | 03009925 | 2/2003 |

OTHER PUBLICATIONS

Communication Pursuant to Article 96(2) EPC dated Nov. 30, 2005.

* cited by examiner

SYSTEM AND METHOD OF $NO_x$ ABATEMENT

BACKGROUND

This disclosure relates generally to a method and system for reducing nitrogen oxides ($NO_X$) and for regenerating particulate filters.

Generally, diesel engines release more undesirable $NO_X$ per kilometer into the atmosphere than gasoline engines. This is because diesel engines generally operate at higher flame temperatures in order that the diesel fuel might burn. Reduction of the flame temperatures can lead to significant increases in hydrocarbons, carbon monoxide, soot, and engine power. For at least these reasons, the flame temperatures are generally not reduced, thereby producing the $NO_X$. The reduction of $NO_X$ into nitrogen ($N_2$) by an exhaust after treatment system is increasingly difficult as the air fuel ratio increases. The reduction of $NO_X$, e.g., nitric oxide (NO), nitrogen dioxide ($NO_2$), and nitrous oxide ($N_2O$), in exhaust fluid is a widely addressed problem as a result of environmental concerns and mandated government emissions regulations, particularly in the transportation industry.

One proposed solution for the reduction of $NO_X$ is the use of a three-way conversion catalyst, which can be employed to treat the exhaust fluids. Such three-way conversion catalysts, containing precious metals such as platinum, palladium, and rhodium, can effectively use unburned hydrocarbons and carbon monoxide as reducing agents for the chemical reduction of $NO_X$ in exhaust fluids, provided that the engine is operated around a balanced stoichiometry for combustion (also referred to as "combustion stoichiometry"). The stoichiometric point depends on the fuel. For example, the balanced combustion stoichiometry for gasoline and diesel is generally at an air to fuel ratio between about 14.4 to about 14.7. However, fuel economy and global carbon dioxide emission concerns have made engine operation under lean-burn conditions desirable in order to realize benefits in fuel economy. Under such lean-burn conditions, the air-to-fuel ratio may be greater than the balanced combustion stoichiometry, i.e., greater than about 14.7, and may be between about 19 to about 35. When lean-burn conditions are employed, three-way conversion catalysts are generally efficient in completely oxidizing the unburned hydrocarbons and carbon monoxides into carbon dioxide and water. However, three-way conversion catalysts are generally inefficient in the reduction of $NO_X$.

Another approach for treating $NO_X$ in exhaust fluids is to incorporate a $NO_X$ adsorber, also referred to as a "lean-$NO_X$ trap," in the exhaust lines. The $NO_X$ adsorber promotes the catalytic oxidation of $NO_X$ by utilizing catalytic metal components effective for such oxidation, such as precious metals. The formation of $NO_2$ is generally followed by the formation of a nitrate when the $NO_2$ is adsorbed onto the catalyst surface. The $NO_2$ is thus "trapped", i.e., stored, on the catalyst surface in the nitrate form. The system can be periodically operated under fuel-rich combustion to regenerate the $NO_X$ adsorber. During this period of fuel-rich combustion, the absence of oxygen and the presence of reducing agents promote the reduction and subsequent release of the stored nitrogen oxides as nitrogen and water. However, this period of fuel-rich combustion may also result in a significant fuel penalty.

A more active approach, such as urea injection upon selective reduction catalyst (SCR), can also be used for $NO_X$ control. Urea selective catalyst reduction reduces the $NO_X$ emissions in diesel engines by atomizing and dispersing aqueous urea in the flowing exhaust fluid stream. In order to effectively reduce the $NO_X$ emissions, the urea selective catalyst reduction system contains components that accurately meter the aqueous urea into the exhaust fluid stream and that homogeneously disperse it in order to achieve maximum catalyst utilization. These components, in addition to the urea supplying components, however, add bulk and size to the device and thereby restrict its usage to heavy-duty applications. Further, the added complexity of the urea injection and the lack of a urea distribution infrastructure are significant detractors to using urea injection.

In addition, the urea selective catalyst reduction system is generally operated at elevated temperatures of greater than about 200° C., since urea can undergo polymerization and polymerized urea cannot be decomposed below 200° C. In some applications, such as stop and go city driving, the exhaust temperature does not even reach 200° C. Excess hydrocarbon must therefore be post-injected into the exhaust stream to elevate the exhaust temperature in order to decompose the polymerized urea. The use of such elevated temperatures generally causes an undesirable amount of additional fuel to be consumed in the operation of the selective catalyst reduction system.

In view of the aforementioned drawbacks with the three-way conversion catalyst, the lean-$NO_X$ trap, and the urea selective catalyst reduction system, it is desirable to have an onboard method and system of a size suitable for use in light duty diesel applications e.g., passenger cars, for purposes of reducing $NO_X$ emissions as well as for regenerating particulate filters.

BRIEF SUMMARY

An embodiment of a $NO_X$ abatement system comprises: a first $NO_X$ adsorber capable of being disposed in-line and downstream of and in fluid communication with an engine; a selective catalytic reduction catalyst disposed in-line and downstream of and in direct fluid communication with the first $NO_X$ adsorber, wherein the selective catalytic reduction catalyst is capable of storing ammonia; and an off-line reformer disposed in selective communication with and upstream of the first $NO_X$ adsorber and the selective catalytic reduction catalyst, wherein the reformer is capable of producing a reformate comprising primarily hydrogen and carbon monoxide.

Another embodiment of a $NO_X$ abatement system comprises: an in-line selective catalytic reduction catalyst capable of being disposed in fluid communication with an engine, wherein the selective catalytic reduction catalyst is capable of storing ammonia; an off-line reformer in fluid communication with the selective catalytic reduction catalyst, wherein the reformer is capable of producing a reformate comprising primarily hydrogen and carbon monoxide; and an off-line reactor in fluid communication with and downstream of the reformer, wherein the reactor comprises an ammonia forming catalyst.

A third embodiment of a $NO_X$ abatement system comprises: an off-line membrane capable of inhibiting passage of oxygen through the membrane; an off-line reformer disposed downstream of and in fluid communication with the membrane and a fuel source, wherein the reformer is capable of producing ammonia from fuel and nitrogen; and an in-line selective catalytic reduction catalyst capable of being disposed downstream of and in fluid communication with an engine and the reformer, wherein the selective catalytic reduction catalyst is capable of storing ammonia.

A fourth embodiment of a $NO_X$ abatement system comprises: an in-line non-thermal plasma reactor capable of being disposed downstream of and in fluid communication with an engine; an in-line selective catalytic reduction catalyst disposed downstream of and in direct fluid communication with the non-thermal plasma reactor; and an off-line reformer disposed upstream of and in fluid communication with the selective catalytic reduction catalyst.

An embodiment of a method of $NO_X$ abatement, comprises storing engine $NO_X$ from an exhaust stream in a initial $NO_X$ adsorber during a storage phase; forming reformate comprising primarily hydrogen and carbon monoxide in an off-line reformer during a regeneration phase; reacting the reformate with the stored $NO_X$ to produce ammonia during the regeneration phase; storing the ammonia in a selective catalytic reduction catalyst during the regeneration phase; and bypassing the exhaust stream around the initial $NO_X$ adsorber during the regeneration phase.

Another embodiment of a method of $NO_X$ abatement, comprises burning fuel off-line to form burner $NO_X$; forming a reformate comprising primarily hydrogen and carbon monoxide, off-line; reacting the burner $NO_X$ with the reformate to form ammonia, off-line; storing the ammonia in an in-line selective catalytic reduction catalyst; introducing engine $NO_X$ to the selective catalytic reduction catalyst; and reacting the engine $NO_X$ with the ammonia.

A third embodiment of a method of $NO_X$ abatement comprises passing air having an initial nitrogen concentration to a membrane to form a membrane effluent having a subsequent nitrogen concentration, wherein the subsequent nitrogen concentration is greater than the initial concentration; mixing the membrane effluent and a fuel in a mixing chamber disposed upstream of and in fluid communication with a reformer; introducing the mixed air and fuel into the reformer to produce a reformate comprising ammonia; periodically introducing ammonia to a selective catalytic reductive catalyst to regenerate the catalyst; reacting the ammonia stored in the selective catalytic reductive catalyst with $NO_X$ in an exhaust fluid.

A fourth embodiment of a method of $NO_X$ abatement comprises introducing an engine exhaust stream to a non-thermal plasma reactor; controlling a ratio of NO to $NO_2$ in the exhaust stream, wherein the ratio is about 1:0.6 to about 1:1.5 at temperatures less than or equal to about 200° C.; forming reformate comprising primarily hydrogen and carbon monoxide; introducing non-thermal plasma reactor effluent and the reformate to a selective reduction catalyst; and reducing the $NO_X$ to nitrogen.

The above-described and other features will be appreciated and understood by those skilled in the art from the following detailed description, drawings, and appended claims.

BRIEF DESCRIPTION OF THE DRAWINGS

Refer now to the figures, which are exemplary embodiments and wherein like elements are numbered alike.

DETAILED DESCRIPTION

Figure 1:
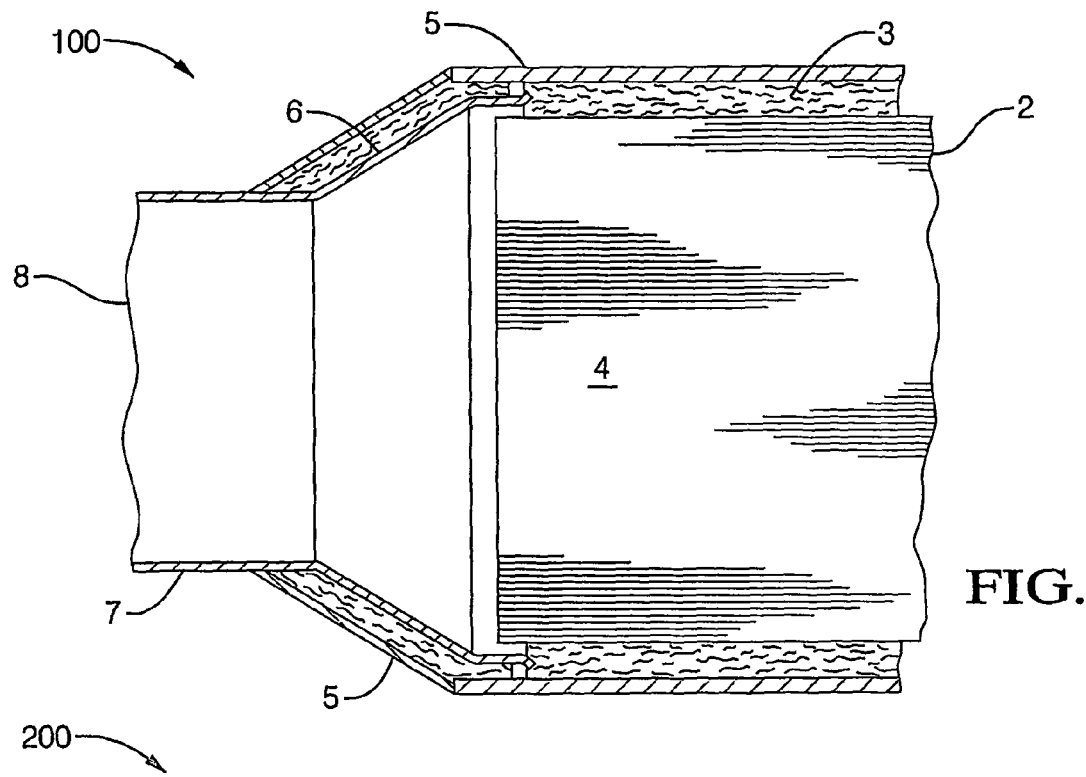
FIG. 1 is a partial cross-sectional view of an exemplary exhaust treatment device.

Disclosed herein is an on-board system for the production of ammonia using on-board generated $NO_X$ as well as an on-board generated reformate comprising primarily hydrogen and carbon monoxide, i.e., greater than or equal to 80% of the total volume of reformate is hydrogen and carbon monoxide. Preferably, greater than or equal to 90% of the reformate are hydrogen and carbon monoxide. The term "on-board" is used herein to refer to the production of a given component within a vehicle (e.g., automobile, truck, etc.) system. While all embodiments disclosed herein use "on-board" production of ammonia and/or reformate, as will be discussed in greater detail, these components may be produced "in-line" or "off-line". The term "line" refers to an exhaust fluid stream. As such, "in-line" refers to production of a component, e.g., ammonia, within the exhaust fluid stream, whereas "off-line" production refers to the production of a given component outside of an exhaust fluid stream. The component produced "off-line" may then be introduced into the exhaust fluid stream.

In describing the arrangement of exhaust treatment devices within a system, the terms "upstream" and "downstream" are used. These terms have their ordinary meaning. For example, an "upstream" device as used herein refers to a device producing a fluid output stream that is fed to a "downstream" device. Moreover, the "downstream" device is the device receiving the output from the "upstream" device. However, it is envisioned that a device may be both "upstream" and "downstream" of the same device in certain configurations, e.g., a system comprising a recycle loop.

The term "direct" fluid communication is also used throughout this disclosure. The term "direct" as used herein refers to a communication between a first point and a second point in a system that is uninterrupted by the presence of reaction devices, such as, a reactor, converter, filter, and the like, but may have other devices such as valves, mixers, flow regulators, and the like, that are generally not used for purposes of reacting exhaust fluids or removing components from an exhaust fluid. Additionally, the term "serial" fluid communication is used herein generally to refer to fluid flow through a given device in the order specified in that series. It is additionally noted that, where valves are discussed and illustrated, the valves can divert all or a portion of the flow to each conduit connected to the exiting of the valve, i.e., the valve disposes various components in selective communication (e.g., the reactor is in selective communication with the $NO_X$ adsorber and the SCR because the flow from the reactor may be controlled to be periodic).

Several combinations of exhaust treatment devices (e.g., catalytic converters, oxidation catalysts, particulate filters, $NO_X$ catalysts, $NO_X$ adsorbers, plasma reactors) are discussed hereunder with references to individual figures. One of skill in the art will easily recognize that many of the devices of each of the embodiments are similar to or identical to each other. These various devices may be added or omitted based on various design choices. As such, various elements and/or features may be introduced in a given figure with the understanding that the systems may be modified as taught herein to include features illustrated in other embodiments. Each of these elements is first introduced in the discussion of a given figure, but is not repeated for each embodiment. Rather, distinct structure is discussed relative to each figure/embodiment.

Furthermore, it is noted that various exhaust treatment devices can have similar structural elements to each other. For example, an exhaust treatment device generally comprises a substrate, a retention material disposed around the substrate to form a subassembly, and a shell disposed around the subassembly. As such, an exemplary exhaust treatment device is shown in FIG. 1 to illustrate the common elements of the exhaust treatment device(s). However, distinct features of each exhaust treatment device will be discussed in greater detail when each treatment device is first introduced.

Referring now to FIG. 1, an exemplary exhaust treatment device, generally designated 100, is illustrated. This exhaust treatment device 100 comprises a substrate 2 located within a retention material 3 forming a subassembly 4. A shell 5 is disposed around the subassembly 4. An end-cone 6, comprising a snorkel 7 having an opening 8, is in physical communication with shell 5. Opening 8 allows exhaust fluid communication with substrate 2.

As will be discussed in much greater detail, various exhaust treatment devices can have a catalyst deposited on/throughout substrate 2 (hereinafter "on"). The catalyst (as well as any support, stablizer, promoter, and the like), can be washcoated, imbibed, impregnated, physisorbed, chemisorbed, precipitated, or otherwise applied onto and/or within the substrate. It is further noted that catalyst metals, catalyst materials, and the like that are introduced with respect to one exhaust treatment device may be the same with respect to another exhaust treatment device unless otherwise noted.

Substrate 2 may comprise any material designed for use in a spark ignition or diesel engine environment and having the following characteristics: (1) capable of operating at temperatures up to about 600° C., and up to about 1,200° C. for some applications, depending upon the device's location within the exhaust system (manifold mounted, close coupled, or underfloor) and the type of system (e.g., gasoline or diesel); (2) capable of withstanding exposure to hydrocarbons, nitrogen oxides, carbon monoxide, particulate matter (e.g., soot and the like), carbon dioxide, and/or sulfur; and (3) having sufficient surface area and structural integrity to support a catalyst.

While the materials used for the substrate may vary with the exhaust treatment device, some common materials include cordierite, silicon carbide, metal, metal oxides (e.g., alumina, and the like), glasses, and the like, and mixtures comprising at least one of the foregoing materials. These materials may be in the form of foils, perform, mat, fibrous material, monoliths (e.g., a honeycomb structure, and the like), other porous structures (e.g., porous glasses, sponges), foams, pellets, particles, molecular sieves, and the like (depending upon the particular device), and combinations comprising at least one of the foregoing materials and forms; e.g., metallic foils, open pore alumina sponges, and porous ultra-low expansion glasses.

Although the substrate 2 may have any size or geometry, the size and geometry are preferably chosen to optimize surface area in the given exhaust emission control device design parameters. For example, the substrate 2 may have a honeycomb geometry, with the combs through-channel having any multi-sided or rounded shape, with substantially square, triangular, pentagonal, hexagonal, heptagonal, octagonal, or similar geometries preferred due to ease of manufacturing and increased surface area.

Located between the substrate 2 and the shell 5 may be a retention material 3 that insulates the shell 5 from both the exhaust fluid temperatures and the exothermic catalytic reaction occurring within the catalyst substrate 2. The retention material 3, which enhances the structural integrity of the substrate 2 by applying compressive radial forces about it, reducing its axial movement and retaining it in place, may be concentrically disposed around the substrate 2 to form a retention material/substrate subassembly 4.

The retention material 3, which may be in the form of a mat, particulates, or the like, may be an intumescent material (e.g., a material that comprises vermiculite component, i.e., a component that expands upon the application of heat), a non-intumescent material, or a combination thereof. These materials may comprise ceramic materials (e.g., ceramic fibers) and other materials such as organic and inorganic binders and the like, or combinations comprising at least one of the foregoing materials. Non-intumescent materials include materials such as those sold under the trademarks "NEXTEL" and "INTERAM 1101HT" by the "3M" Company, Minneapolis, Minn., or those sold under the trademark, "FIBERFRAX" and "CC-MAX" by the Unifrax Co., Niagara Falls, N.Y., and the like. Intumescent materials include materials sold under the trademark "INTERAM" by the "3M" Company, Minneapolis, Minn., as well as those intumescents which are also sold under the aforementioned "FIBERFRAX" trademark, as well as combinations thereof and others.

The retention material/substrate subassembly 4 may be concentrically disposed within a shell 5. The choice of material for the shell 5 depends upon the type of exhaust fluid, the maximum temperature reached by the substrate 2, the maximum temperature of the exhaust fluid stream, and the like. Suitable materials for the shell 5 may comprise any material that is capable of resisting under-car salt, temperature, and corrosion. For example, ferrous materials may be employed such as ferritic stainless steels. Ferritic stainless steels may include stainless steels such as, e.g., the 400—Series such as SS-409, SS-439, and SS-441, with grade SS-409 generally preferred.

End cone 6 (or alternatively an end cone(s), end plate(s), exhaust manifold cover(s), and the like), which may comprise similar materials as the shell, may be disposed at one or both ends of the shell. The end cone 6 is sealed to the shell to prevent leakage at the interface thereof. These components may be formed separately (e.g., molded or the like), or may be formed integrally with the housing using methods such as, e.g., a spin forming, or the like.

Figure 2:
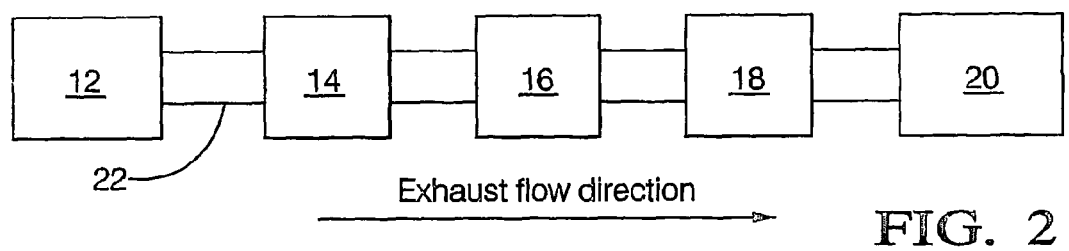
FIG. 2 is a schematic view of an embodiment of an exemplary exhaust treatment system.

Referring now to FIG. 2, an exhaust treatment system generally designated 200 is illustrated. While the location, number, and size, of each component may vary, this figure provides a starting point for discussion. The exhaust treatment system 200 comprises an engine 12. While the engine may be a gasoline engine or a diesel engine, the system(s) illustrated herein are preferably for diesel engine systems. Disposed in fluid communication with engine 12 is a first oxidation catalyst 14, a particulate filter 16, a $NO_X$ adsorber 18, and a Selective Catalytic Reduction (SCR) catalyst 20. An arrow labeled "exhaust flow direction" indicates the general flow of the exhaust in an exhaust conduit 22. The exhaust conduit 22 is in fluid communication with each component in the system. For example, in an exemplary embodiment, the general directional flow of exhaust fluid from the engine 12 may be through first oxidation catalyst 14, particulate filter 16, $NO_X$ adsorber 18, and SCR catalyst 20. After passing through SCR catalyst 20, the exhaust fluid may then be discharged into an external environment.

In various embodiments, system 200 devices may be added or removed. For example, particulate filter 16 may be omitted in various embodiments. In other embodiments, $NO_X$ adsorber 18 may also be omitted. Conversely, for example, additional exhaust treatment device(s) (e.g., $NO_X$ adsorber (s), SCR catalyst(s), and/or the like) may be added to the system. The additional $NO_X$ adsorber(s) and/or SCR catalyst (s) are preferably arranged in parallel. The advantages of arranging various system devices in parallel will be discussed in greater detail below.

Oxidation catalyst 14 comprises a catalytic metal, support material(s), and a substrate. The catalytic metal(s) may be disposed on the support material, which is disposed on the substrate. Examples of catalytic metals include, but are not limited to, platinum, palladium, ruthenium, rhodium, iridium, gold, and silver, as well as oxides, alloys, salts, and mixtures comprising at least one of the foregoing metals.

The catalytic metal can comprise, for example, up to about 95 wt % platinum (e.g., about 60 wt % to about 95 wt %) and up to about 50 wt % palladium and/or rhodium (e.g., about 10 wt % to about 50 wt %), based on the total weight of catalytic metal(s). Within this range, greater than or equal to about 60 wt % of platinum is preferred. Also within this range, less than or equal to about 95 wt % of platinum is preferred, with less than or equal to about 70 wt % more preferred. Within the foregoing range, greater than or equal to about 10 wt % of palladium or rhodium is preferred, with greater than or equal to about 20 wt % more preferred. Also within this range, less than or equal to about 40 wt % is preferred, with less than or equal to about 30 wt % more preferred.

Preferably, oxidation catalyst 14 comprises support materials. Such materials include, but are not limited to, gamma aluminum oxide, delta aluminum oxide, theta aluminum oxide, stabilized aluminum oxides, titanium oxides, zirconium oxides, yttrium oxides, lanthanum oxides, cerium oxides, scandium oxides, and the like, as well as combinations comprising at least one of the foregoing. Particularly a mixture of lanthanum stabilized (gamma or delta phase) aluminum oxide, a titanium-zirconium solid solution, or a combination comprising at least one of these support materials is preferred.

The support material(s) can be employed at about 0.5 grams per cubic inch ($g/in^3$) (about 0.03 grams per cubic centimeter ($g/cm^3$)) to about 6.0 $g/in^3$ (about 0.4 $g/cm^3$), based on the volume of the substrate. Within this range, greater than or equal to about 1.0 $g/in^3$ (about 0.06 $g/cm^3$) is preferred, more preferably greater than or equal to about 2.0 $g/in^3$ (about 0.1 $g/cm^3$), and most preferably greater than or equal to about 3.0 $g/in^3$ (about 0.2 $g/cm^3$). Also within this range, less than or equal to about 6.0 $g/in^3$ (about 0.4 $g/cm^3$) is preferred, more preferably less than or equal to about 5.0 $g/in^3$ (about 0.3 $g/cm^3$), and most preferably less than or equal to about 4.0 $g/in^3$ (about 0.2 $g/cm^3$). The catalytic metal loadings can comprise about 0.005 wt % to about 25.0 wt %, wherein the weight percent is based on the total weight of the support material(s) and catalytic metal(s).

Preferably, the substrate includes, but is not limited to, cordierite, mullite, alpha-aluminum oxide, aluminum phosphate, aluminum titanate, aluminosilicate, zirconium oxide, titanium oxide, titanium phosphate and/or magnesium silicate. Preferably, the substrate has an extruded honeycomb cell geometry comprising greater than or equal about 400 cells per square inch, and a wall thickness of less than or equal to about 8.0 mils (about 0.02 cm).

In an exemplary embodiment, the support material comprises two parts, labeled Part 1 component and Part 2 component merely for clarity in the following discussion. Part 1 component as used herein refers to a support material having an agglomeration of primary particles, wherein the agglomeration size (taken along the major diameter (i.e., the longest diameter)) is about 5 micrometers to about 15 micrometers and the primary particle size is less than or equal to about 300 nanometers. The term "agglomerate" is used herein to refer to a cluster or group of primary particles. The term "primary particle" is used herein to generally refer to the individual constituent particles forming the agglomerate. In other words, a primary particle is a single particle, whereas an agglomerate comprises at least two primary particles. Part 2 component as used herein refers to a support material having a primary particle size of less than or equal to about 500 nanometers, wherein Part 2 components preferably have an agglomerate size of less than or equal to about 0.5 micrometers, with less than or equal to about 0.3 micrometers preferred, and less than or equal to about 0.2 micrometers more preferred.

Preferably, Part 1 component and Part 2 component are mixed together and applied to the substrate to form a support material layer having a thickness of less than or equal to about 120 micrometers, with a thickness of about 80 micrometers to about 100 micrometers preferred. Preferably, a ratio of Part 1 component to Part 2 component is about 80:20 to about 20:80. In an exemplary embodiment, the catalytic metal may be disposed on Part 1 component and on Part 2 component, individually, before mixing the components.

Part 1 component can comprise an alkaline earth, an alkaline metal, or a rare earth stabilized aluminum oxide. Preferably, the stabilized aluminum oxide is stabilized gamma aluminum comprising a sufficient amount of stabilizer to prevent the alumina from transforming to alpha alumina with a temperature exotherm of less than or equal to about 800° C.; e.g., up to about 20 wt % stabilizer, with about 0.5 wt % to about 15 wt % preferred, and about 2 wt % to about 6 wt % more preferred, wherein weight percents are based on the total weight of the stabilized aluminum oxide. The Part 2 component can comprise an alkaline earth, an alkaline metal or a rare earth stabilized solid solution. Preferably, the stabilized solid solution comprises up to about 20 wt % stabilizer, with about 0.5 wt % to about 15 wt % preferred, and about 6 wt % to about 12 wt % especially preferred. All ranges disclosed herein are inclusive and combinable (e.g., ranges of up to about 25 wt %, with about 5 wt % to about 20 wt % desired, and about 10 wt % to about 15 wt % more desired, would therefore include the ranges of about 5 wt % to about 25 wt %, about 10 wt % to about 25 wt %, about 5 wt % to about 15 wt %, etc.).

The rare earth(s) comprising Part 1 and/or Part 2 may be selected from scandium, yttrium, lanthanum, cerium, praseodymium, neodymium, dysprosium, and ytterbium.

The alkaline earths, alkaline earth metals and rare earths may be introduced, for example, as particulate oxides, carbonates, oxychlorides, sulfates, soluble inorganic solutions (e.g., of nitrates, chlorides, fluorides, bromides, sulfides, ammines, and/or hydroxides), soluble organic solutions (e.g., of carboxylates, acetates, citrates, and/or formats), or colloidal sols e.g., of ethoxides, methoxides methoxyethanols, isopropoxides, and/or the like), and the like, as well as combinations comprising at least one of the foregoing.

Part 1 materials include, but are not limited to barium stabilized gamma, delta and/or theta aluminum oxide, lanthanum stabilized gamma, delta and/or theta aluminum oxide, barium-aluminate, barium hexaaluminate, and the like, as well as combinations comprising at least one of the foregoing, with lanthanum stabilized gamma-delta aluminum oxide desirable.

Part 2 materials include solid solutions including, but not limited to, titanium-zirconium oxide, yttrium-zirconium oxide, barium-zirconium oxide, lanthanum-titanium oxide and the like, as well as combinations comprising at least one of the foregoing, with lanthanum-titanium-zirconium oxide desirable. Advantageously, solid solutions can impede grain growth of the catalyst metal in strongly reducing environments (e.g., an environment comprising an air to fuel ratio of less than or equal to 11), thereby, improving the catalyst endurance.

The particulate filter 16 can comprise any filter and design capable of removing particulate matter from the exhaust stream and preventing the emission of such particulate matter into the atmosphere. Preferably, the particulate filter comprises a gas permeable ceramic material having a honeycomb structure comprising a plurality of channels, preferably parallel channels. The channels can be divided into alternating inlet channels and exit channels. The inlet channels are open at an inlet end of the filter element and are preferably plugged at the exit end of the filter. Conversely, exit channels are preferably plugged at the inlet end and open at the exit end of the filter. The inlet and exit channels are separated by porous sidewalls, that permit the exhaust gases to pass from the inlet channels to the exit channels along their length.

The particulate filter 16 generally comprises a shell, a retention material, and a filter element (e.g., substrate). Materials for the shell and the retention material may include those listed above with regard to an exemplary exhaust treatment device.

The filter element is generally desired to filter out the particulate matter present in the exhaust. It may generally be manufactured from materials such as ceramics such as cordierite, metallics such as sintered stainless steel powder, carbides (such as silicon carbide), nitrides (such as silicon nitride), and the like, as well as combinations comprising at least one of the foregoing materials. Such materials preferably possess a sufficient porosity to permit the passage of exhaust gas and reformate through the element walls, and yet filter out a substantial portion, if not all of the particulate matter present in the exhaust. Preferably the filter has greater than or equal to about 20% porosity and more preferably greater than or equal to about 40% porosity. Preferably, the filter pores through the substrate have a major diameter of less than or equal to about 30 micrometers and more preferably less than or equal to about 20 micrometers. Preferably the filter pores are greater than or equal to about 0.1 micrometer and more preferably greater than or equal to about 0.4 micrometers.

The particulate filter element may optionally include a catalyst on the filter element (e.g., a coating of a catalyst material). Preferably, the catalyst material performs a reforming function, e.g., a water gas shift catalyst (WGS) that converts carbon monoxide and water into hydrogen and carbon dioxide. Examples of WGS catalyst metals include, but are not limited to, platinum, palladium, rhodium, ruthenium, their oxides, and the like as well as combinations comprising at least one of the foregoing metals and/or their oxides. The WGS catalyst may be disposed on support material(s). Suitable support materials include those discussed above with respect to oxidation catalyst 14. Preferably, the support materials include aluminum oxide, silicon oxide, zirconium oxide, titanium oxide, and the like, as well as combinations comprising at least one of the following. Preferably, the WGS catalyst comprises a platinum impregnated lanthanum-titanium-yttrium-zirconium solid solution.

Additionally, the catalyst material may include a promoter oxide(s) such as vanadium, chromium, manganese, iron, cobalt, copper, lanthanum, cerium, praseodymium, neodymium, ytterbium, or a mixture comprising one or more of the foregoing promoter oxides.

The catalyst material can be at a loading sufficient to convert greater than or equal to about 50% (vol %) of the water present in the exhaust to hydrogen; e.g., about 0.05 g/in$^3$ (about 0.003 g/cm$^3$) to about 4.0 g/in$^3$ (about 0.2 g/cm$^3$), with about 0.2 (about 0.01 g/cm$^3$) to about 1.0 g/in$^3$ (about 0.06 g/cm$^3$) preferred. The WGS catalyst metal(s) portion can be present in an amount of about 0.01 g/in$^3$ (about 0.0006 g/cm$^3$) to about 0.11 g/in$^3$ (about 0.007 g/cm$^3$) of substrate with about 0.02 g/in$^3$ (about 0.001 g/cm$^3$) to about 0.04 g/in$^3$ (about 0.002 g/cm$^3$) preferred. The promoter oxide(s) can be present in an amount of about 0.1 g/in$^3$ (about 0.006 g/cm$^3$) to about 1.2 g/in$^3$ (about 0.07 g/cm$^3$), with about 0.4 g/in$^3$ (about 0.02 g/cm$^3$) to about 0.7 g/in$^3$ (about 0.04 g/cm$^3$) preferred. The support materials portion can be present in an amount of about 0.7 g/in$^3$ (about 0.04 g/cm$^3$) to about 1.9 g/in$^3$ (about 0.1 g/cm$^3$) with about 1.2 g/in$^3$ (about 0.07 g/cm$^3$) to about 1.6 g/in$^3$ preferred. The promoter oxide and support oxide average particle diameters are preferably less than or about 2 micrometers and preferably less than or equal to about 10 micrometers, with less than or about 90 percent of the particles having an average particle diameter of about 3 micrometers to about 6 micrometers preferred e.g., an average particle diameter of 4.4 micrometers.

The $NO_X$ adsorber 18 generally comprises a substrate, catalytic metal(s), support materials, and $NO_X$ trapping material(s). The catalytic metal component, the catalytic metal support, and the $NO_X$ trapping materials can be washcoated, imbibed, impregnated, physisorbed, chemisorbed, precipitated, or otherwise applied onto and/or within the porous substrate.

Additionally, the substrate may comprise a protective coating that is applied to the substrate before the substrate receives the catalyst (e.g., is washcoated). Preferably, the protective coating comprises a metal phosphate. The metal phosphate reduces fluxing of the substrate due in particular to migration of the $NO_X$ trapping materials such as barium and potassium.

For example, zirconium phosphate can bond with the zirconia that is present in a cordierite substrate improving the strength of thin wall substrate, e.g., 900 cells/in$^2$ with 2 mil (about 0.005 cm) walls. Zirconium phosphate is preferably applied to cordierite substrate using a dipping process, and then calcined to at least 400° C. The resulting coating of zirconium phosphate has a thickness of greater than to about 10 nanometers, with greater than to about 8 nanometers preferred, and greater than to about 4 nanometers more preferred. Zirconium phosphate is resistant to both basic and acidic conditions, to corrosive materials such as nitrates, chlorides, hydroxides, alkaline earth oxides, alkaline metal oxides, transition metal oxides, rare earth oxides, precious metal salts, reducing gasses such as hydrogen and carbon monoxide, as well as acidic gasses such as nitrogen oxides and sulfur oxides.

The substrate may include those designs and material as described above with respect to the exemplary exhaust treatment device. For example, some possible substrate materials include cordierite, mullite, metallic foils, zirconium toughened aluminum oxide, silicon carbide and the like, and mixtures comprising at least one of the foregoing materials. Preferably, the $NO_X$ adsorber substrate is a cordierite substrate with an extruded honeycomb cell geometry comprising less than or about 600 cells per square inch, and a wall thickness of less than or equal to about 4.0 mils (about 0.01 cm).

The catalytic metal of NO$_X$ adsorber 18 comprises those listed above with respect to oxidation catalyst 14. The catalytic metal is present in an amount sufficient to partially reduce NO$_X$ to NH$_3$; e.g., an amount of about 0.01 wt % to about 4.0 wt %, based on the total weight of the catalytic metal, catalytic metal support material, and NO$_X$ trapping material, about 0.5 wt % to about 2.0 wt % preferred.

Where the catalytic metal is a combination of rhodium with one or more other metals, the other metals, e.g., palladium, platinum, and the like, are present in an amount less than the rhodium. For example, with a platinum/rhodium combination, the catalytic metal comprises about 70 wt % to about 95 wt % rhodium and about 5 wt % to about 30 wt % platinum. Within this range, for a platinum/rhodium combination it is generally desirable to have an amount of rhodium of greater than or equal to about 75 wt %, and preferably greater than or equal to about 85 wt %, based on the total weight of the combination. Within this range, it is also desirable to use the platinum in an amount of less than or equal to about 20 wt %, and preferably in an amount of less than or equal to about 10 wt %, based on the total weight of the combination.

The support material of NO$_X$ adsorber 18 can comprise support materials to those previously listed above with respect to oxidation catalyst 14. For example, the support materials include, but are not limited to, zirconium oxides, zinc oxide, gamma aluminum oxide, delta aluminum oxide, theta aluminum oxide, stabilized aluminum oxides, alkaline earth aluminates transition metal hexaaluminates and the like, as well as combinations comprising at least one of the foregoing, and more particularly zinc-zirconium solid solutions.

In addition to the catalytic metal, the support materials may be further loaded NO$_X$ trapping material(s), such as alkali metal oxides, alkaline earth metal oxides, and mixtures comprising at least one of the foregoing metal oxides. Suitable trapping materials include oxides of barium, strontium, calcium, magnesium, cesium, lithium, sodium, potassium, magnesium, rubidium and the like, and combinations comprising at least one of the foregoing, and more particularly a mixture of oxides of barium and potassium.

The NO$_X$ trapping material can be employed at an amount sufficient to adsorb NO$_X$, e.g., at greater than to about 28 wt %, based on the combined total weight of the catalytic metal, support materials, NO$_X$ trapping material, and hydrophobic material ("NO$_X$ combined weight"), with about 4 wt % to about 28 wt % preferred, about 8 wt % to about 22 wt % more preferred, and about 12 wt % to about 16 wt % even more preferred. The catalytic metal can be employed at about 0.1 wt % to about 4.0 wt % based on the NO$_X$ combined weight. Within this range, greater than or equal to about 0.5 wt % is preferred, greater than or equal to about 0.75 wt % is more preferred, and greater than or equal to about 1.0 wt % is most preferred. Also within this range, less than or equal to about 4.0 wt % is preferred, less than or equal to about 3.0 wt % is more preferred, and less than or equal to about 2.0 wt % is most preferred.

Further, the NO$_X$ trapping material may be coated with a hydrophobic material such as titanium oxide. Suitable titanium sources generally include titanium oxychloride, titanium oxynitrate, titanium isobutoxide, titanium n-butoxide, titanium tert-butoxide, titanium ethoxide, titanium isopropoxide, titanium methoxide, titanium n-propoxide and colloidal titanium oxide. Preferably, the hydrophobic material is present in an amount sufficient to render the NO$_X$ trapping material hydrophobic, e.g., about 0.1 wt % to about 2 wt %, with 0.2 wt % to about 1 wt % more preferred, wherein the weight percentages are based on the NO$_X$ combined weight.

The SCR catalyst 20 generally comprises a substrate, catalytic metal(s), support materials, and ammonia (NH$_3$) trapping material(s). Suitable NH$_3$ trapping materials include vanadium oxides, niobium oxides, molybdenum oxides, tungsten oxides, rhenium oxides, and the like, and combinations comprising at least one of the foregoing. Generally, the substrate, the catalytic metal(s), and the support materials employed in the SCR catalyst 20 are substantially the same as that used in NO$_X$ adsorber 18. Preferably, the catalytic metal can be employed at about 0.01 wt % to about 4.0 wt %, based on the total weight of the catalytic metal, catalytic metal support, and NH$_3$ trapping component. Within this range, greater than or equal to about 0.01 wt % is preferred, more preferably greater than or equal to about 0.1 wt %, and most preferably greater than or equal to about 0.2 wt %. Also within this range, less than or equal to about 4.0 wt % is preferred, more preferably less than or equal to about 3.0 wt %, and most preferably less than or equal to about 2.0 wt %.

Where the catalytic metal is a combination of rhodium with one or more other metals, the other metals, e.g., palladium, platinum, and the like, are present in an amount less than the rhodium. For example, with a platinum/rhodium combination, the catalytic metal component can comprise about 70 wt % to about 95 wt % rhodium and about 5 wt % to about 30 wt % platinum. Within this range, for a platinum/rhodium combination it is generally desirable to have an amount of greater than or equal to about 75 wt %, and preferably greater than or equal to about 85 wt % rhodium based on the total weight of the combination. Within this range, it is also desirable to use the platinum in an amount of less than or equal to about 20 wt %, and preferably in an amount of less than or equal to about 10 wt % based on the total weight of the combination.

The NH$_3$ trapping material(s) component can be employed in an amount sufficient to trap breakthrough NH$_3$. Generally it will be employed in amount about 32 wt %, based on the total weight of the catalytic metal component(s), support materials and NH$_3$ trapping materials ("SCR combined weight"). Within this range, greater than or equal to about 2 wt % is preferred, greater than or equal to about 4 wt % more preferred, and greater than or equal to about 6 wt % even more preferred. Also within this range, less than or equal to about 18 wt % is preferred, less than or equal to about 14 wt % more preferred, and less than or equal to about 10 wt % even more preferred. The catalytic metal component can be employed at about 0.01 wt % to about 4.0 wt %, based on the SCR combined weight. Within this range, greater than or equal to about 0.01 wt % is preferred, greater than or equal to about 0.5 wt % more preferred, and greater than or equal to about 1.0 wt % even more preferred. Also within this range, less than or equal to about 6.0 wt % is preferred, less than or equal to about 4.0 wt % more preferred, and less than or equal to about 2.0 wt % even more preferred.

Preferably, SCR substrate is a cordierite substrate with an extruded honeycomb cell geometry comprising less than 900 cells per square inch, and a wall thickness of less than or equal to 4.0 mils (about 0.01 cm). In addition to the catalytic metal (s), the support materials, and the NH$_3$ trapping materials, the substrate may comprise a protective coating of phosphate (e.g., metal phosphate) preferably disposed between the substrate and the NH$_3$ tapping materials. The phosphate reduces fluxing of the porous support due to the NH$_3$ trapping materials, such as vanadium oxides, niobium oxides, molybdenum oxides, tungsten oxides, and/or, rhenium oxides, Referring now to FIG. 3, an exemplary exhaust treatment system generally designated 300 is illustrated. A fuel source 26 is in direct fluid communication with a reformer 24. Reformer 24 is capable of direct fluid communication with oxidation catalyst 14, particulate filter 16, and/or $NO_X$ adsorber 18. Reformate (e.g., hydrogen, carbon monoxide, partially oxidized organics such as aldehydes, ketones and carboxylic acids, and/or light gasses such as methane, ethane, propane, and/or butane) from reformer 24 may be selectively directed to oxidation catalyst 14, particulate filter 16, and/or $NO_X$ adsorber 18 via valve 28. Preferably, the reformate comprises primarily hydrogen and carbon monoxide, i.e., greater than or equal to 80% of the total volume of reformate is hydrogen and carbon monoxide, with greater than or equal to 90% preferred. The reformate may be used to regenerate oxidation catalyst 14, particulate filter 16, and/or $NO_X$ adsorber 18. A discussion of using reformate to selectively regenerate an oxidation catalyst(s), particulate filter(s), and/or $NO_X$ adsorber(s) is found in U.S. patent application Ser. No. 10/301,455, which is herein incorporated by reference.

For example, high temperature hydrogen gas, e.g., reformate at about 600° C., and thermal energy generated from partial oxidation reactions in the reformer 24 can be used to regenerate the particulate filter 16. For example, hydrogen (e.g., reformate) can be introduced upstream of oxidation catalyst 14 (disposed upstream of and in direct fluid communication with particulate filter 16) to generate an exotherm. The exotherm preferably raises the exhaust temperature to a temperature of greater than or equal to about 300° C., and with greater than or equal to about 350° C. more preferred. However, it is noted that the reformate exiting the reformer may be at a temperature greater than or equal to about 300° C., thereby aiding in elevating the temperature of the exhaust fluid when the reformate is disposed in the exhaust conduit 22. In various embodiments, the conduit 22 may be designed to minimize the heat transferred to the atmosphere, e.g., conduit 22 may be double walled. The heat generated can initiate combustion of trapped particulates in the particulate filter 16. In various other embodiments, particulate filter 16 may further comprise a catalyst, as described above. As such, reformate comprising hydrogen and carbon monoxide may be disposed direct fluid communication with the particulate filter 16 (e.g., reformate can be introduced to exhaust conduit 22, upstream of particulate filter 16 and downstream of oxidation catalyst 14) to generate the exotherm.

The reformate in system 300 can also be employed for the production of ammonia that can be adsorbed by the SCR catalyst 20. As will be described in greater detail below, $NO_2$ trapped in the $NO_X$ adsorber 18 reacts with hydrogen in an oxygen depleted environment to produce ammonia. Since the $NO_X$ adsorber 18 does not have an affinity for strong bases like ammonia, the ammonia does not remain upon the $NO_X$ adsorber 18. Rather, the ammonia flows downstream to SCR catalyst 20. Accordingly, SCR catalyst 20 is preferably located downstream and in direct fluid communication with $NO_X$ adsorber 18. The ammonia adsorbed on the SCR catalyst 20 may be used to reduce an equal amount of $NO_X$ present in the exhaust fluid stream. As such, the $NO_X$ adsorber 18 is thus regenerated by the conversion of the trapped $NO_X$ into $NH_3$ and the SCR catalyst is regenerated by the chemical reaction between $NO_X$ and $NH_3$ forming the reaction products nitrogen and water.

Valve 30 controls the exhaust fluid flow entering $NO_X$ adsorber 18. Valve 30 may be used to divert exhaust fluid flow to the $NO_X$ adsorber 18 during a $NO_X$ storage phase. During this $NO_X$ storage phase, exhaust fluid from the engine 12 is directed to the $NO_X$ adsorber 18 where $NO_X$ present in the exhaust fluid is trapped/adsorbed onto the $NO_X$ adsorber 18. For example, a $NO_X$ trapping phase may comprise a duration of about 60 seconds. Reformer 24 can be inactive and valve 30 closed during the $NO_X$ trapping phase. A reduction/regeneration phase may then comprise a duration of about 4 seconds where the reformer 24 is active (directing reformate to $NO_X$ adsorber 18) and valve 30 is open such that $NO_X$ travels to the SCR where it reacts with stored $NH_3$.

Additional valves may be added to the system(s) to further regulate flow from the reformer 24, engine 12, and/or any other component in the system. As such, it is understood that any discussion of any given valve may also be applied to any other valve in the system. For example, valves 28 and 30 may comprise a spool, butterfly, ball valve, or similar configurations capable of selectively allowing and inhibiting flow. Preferably, valve 30 is a two-way poppet valve. The valve(s) may be in information/command (e.g., electrical) communication with a controller (not shown). The controller may be programmed, for example, such that the $NO_X$ adsorber 18 can be regenerated as needed. For example, in system 300, the controller may be programmed to divert the exhaust fluid by manipulating valve 30 based upon $NO_X$ slip (i.e., the $NO_X$ remaining in the exhaust fluid after exiting a system component, e.g., $NO_X$ adsorber 18), engine schedule, time, and/or a combination of the foregoing. Valves 28 and 30 can also be programmed to provide intermittent flow, for example, a pulse, of hydrogen and carbon monoxide into particulate trap 16, oxidation catalyst 14, and/or $NO_X$ adsorber 18.

As briefly mentioned above, the $NO_X$ adsorber 18 promotes the catalytic oxidation of $NO_X$ by catalytic metal effective for such oxidation. The formation of $NO_2$ is generally followed by the formation of a nitrate when the $NO_2$ is adsorbed onto the catalyst surface. The $NO_2$ is thus "trapped" (i.e., stored) by the $NO_X$ trapping materials on the catalyst surface in the nitrate form. This mode of operation is referred to as the storage phase of the $NO_X$ adsorber 18. In this storage phase of operation, the air to fuel ratio is greater than 14.7. In this same operating condition, the air to fuel ratio is typically less than about 50.

During a regeneration phase of the $NO_X$ adsorber 18, the valve 30 is cycled to divert the exhaust fluid through a by-pass conduit 34, which diverts the exhaust flow around $NO_X$ adsorber 18. At the same time, reformate (i.e., reducing agents) is then introduced into reformate conduit 32, which is in fluid communication with $NO_X$ adsorber 18. As the carbon monoxide reductant consumes oxygen, the air to fuel ratio decreases to less than or equal to about 12 (e.g., about 8.0 to about 12.4), and the reductant hydrogen reacts with $NO_X$ in the $NO_X$ adsorber 18 producing the reductant $NH_3$. The reductant $NH_3$ then collects in SCR catalyst 20 located downstream from $NO_X$ adsorber 18. For example, the SCR catalyst 20 may store the reducing agent as ammonia or react with water forming ammonium hydroxide. Since both flow pathways (i.e., a first fluid pathway is defined as flow through $NO_X$ adsorber 18 and a second fluid pathway is defined as flow around the $NO_X$ adsorber 18 through by-pass conduit 34) merge at SCR catalyst 20, the exhaust fluid that had been diverted around $NO_X$ adsorber 18 via by-pass conduit 34 may be used to react as strong acid (e.g., $NO_X$ and $HNO_3$) with the strong base (e.g., $NH_3$ and $NH_4OH$) on the SCR catalyst surface, forming nitrogen and water. After completion of this regeneration cycle, valve 30 is cycled back such that the flow of exhaust fluid is again through the first exhaust pathway, i.e., through $NO_X$ adsorber 18.

The above-described reactions between carbon monoxide and oxygen, hydrogen and $NO_X$ occur at temperatures of about 140° C. to about 400° C. Within this range, it is generally desirable to conduct the reaction at a temperature of greater than or equal to about 180° C., preferably greater than or equal to about 220° C., and more preferably greater than or equal to about 240° C. Also desirable within this range, is a temperature of less than or equal to about 400° C., preferably less than or equal to about 320° C., and more preferably less than or equal to about 280° C. Reaction of the hydrogen and carbon monoxide with the $NO_X$ adsorber 18 creates an exotherm, which may drive some non-reduced $NO_X$ or partially reduced $NO_X$ (e.g., $N_2O$) from $NO_X$ adsorber. These non-reduced and partially reduced species are, however, fully reduced when they reach the SCR catalyst 20.

It is noted that $NO_X$ adsorber 18 has little chemical affinity for strong bases such as ammonia and hydrogen sulfide. Therefore, as described above, the ammonia generated from the $NO_X$ in the $NO_X$ adsorber 18 is released from the acid adsorbing $NO_X$ adsorber 18, and collects downstream in the base adsorbing SCR catalyst 20, where it is used to reduce the acidic $NO_X$ that may be present in the exhaust fluid being introduced into the SCR catalyst 20 from by-pass conduit 34. In various embodiments, the $NO_X$ adsorber 18 and the SCR catalyst 20 can be disposed in the same housing. Actually, it is envisioned that many of the various substrates (filters, catalyzed substrates, and the like), can be disposed in the same housing in the relationships described herein (e.g., upstream/downstream of the other substrates, etc., accordingly, with spaces between the substrates where desired to enable reformate introduction).

Examples of the fuel source 26 include hydrocarbon fuels such as gasoline, diesel, ethanol, methanol, kerosene, and the like; gaseous fuels, such as natural fluid, propane, butane, and the like; and alternative fuels, such as hydrogen, biofuels, dimethyl ether, and the like; as well as combinations comprising at least one of the foregoing fuels. The selection of fuel source 26 is based upon application, expense, availability, and environmental issues relating to the fuel source 26. The preferred fuel source is diesel since it is readily available on the vehicle. Examples of diesel fuels that can be processed in the reformer 16 include commercial diesel fuels, military diesel fuels, blended diesel fuels containing a larger than normal "light end" component (for example diesel blended with naphtha, kerosene, and/or methanol), and the like, as well as combinations comprising at least one of the foregoing diesel fuels.

Reformer 24 generally generates reformate comprising hydrogen, carbon monoxide, and other byproducts that may include carbon dioxide, and in some cases hydrogen sulfide. Reformer 24 may be configured for partial oxidation, steam reforming, or dry reforming. Preferably, reformer 24 is configured primarily for partial oxidation reforming. However, it is noted that steam reforming and dry reforming may also occur to the extent of the water and carbon dioxide contained in the air and fuel.

Partial oxidation reformers are based on sub-stoichiometric combustion to achieve the temperatures sufficient to reform the hydrocarbon fuel. This reaction is exothermic, which causes the reformate to emerge from the reformer 24 at temperatures of about 700° C. to about 1,000° C. Catalysts can be used with partial oxidation systems (catalytic partial oxidation) to promote conversion of various fuels, such as ethanol, into a synthetic fluid. The use of the catalyst can result in an acceleration of the reforming reactions and can provide this effect at lower reaction temperatures than those that would otherwise be required in the absence of a catalyst. An example of the partial oxidation reforming reaction is as follows:

  (I)

In contrast to partial oxidation reformers, steam configured reformers react fuel and steam in heated tubes filled with catalysts to convert hydrocarbons in the fuel into primarily hydrogen and carbon monoxide. An example of the steam reforming reaction is as follows:

  (II)

Dry reforming systems form hydrogen and carbon monoxide in the absence of water, for example, by using carbon dioxide. An example of the dry reforming reaction is depicted in the following reaction:

  (III)

Reformer 24 preferably comprises a porous substrate, a catalytic metal component and a support material. Preferably, the catalytic metal component is a combination of rhodium with other metals. The other metals, e.g., platinum, and the like, can be present in an amount less than the rhodium. In the case of a platinum-rhodium combination, the catalytic metal component can comprise up to about 95 wt % rhodium and up to about 30 wt % platinum, based on the total weight of the catalytic metal component. Within this range, greater than or equal to about 2.5 wt % of the platinum is preferred, with greater than or equal to about 5 wt % more preferred. Also within this range, less than or equal to about 20 wt % of platinum is preferred.

The support materials can include those materials listed above with respect to oxidation catalyst 14. Preferably, the support materials for the reformer 24, include, but are not limited to, hexaaluminates, aluminates, aluminum oxides (e.g., gamma-aluminum oxide, theta-aluminum oxide, delta-aluminum oxide), gallium oxides, zirconium oxides and titanium oxides. Since the reformer is generally subjected to temperatures greater than or equal to 1,000° C., the reformer support is preferably a hexaaluminate. Hexaaluminates are crystalline, porous structures that are able to withstand high temperatures, e.g., temperatures of about 1,000° C. to about 1,350° C., without sintering. Even at temperatures of up to about 1,600° C., hexaaluminates can have a surface area as high as 20 square meters per gram ($m^2/g$).

The reformer substrate is preferably capable of operating at temperatures less than or equal to about 1,400° C.; capable of withstanding strong reducing environments in the presence of water containing, for example, hydrocarbons, hydrogen, carbon monoxide, water, oxygen, sulfur and sulfur-containing compounds, combustion radicals, such as hydrogen and hydroxyl ions, and the like, and carbon particulate matter; and has sufficient surface area and structural integrity to support the desired catalytic metal component and support material. The reformer porous substrate preferably does not have a glass protective layer, because various reducing agents and hydroxyl groups vaporize glass components such as phosphates, silicates as well as other materials such as metals, graphite, carbides and nitrides.

Materials that can be used as the reformer substrate include, zirconium toughened aluminum oxide, titanium toughened aluminum oxide, aluminum oxide, zirconium oxide, titanium oxide, as well as oxides, alloys, cermets, and the like, as well as combinations comprising at least one of the foregoing materials. Preferred materials for the reformer substrate are aluminum oxide, zirconium oxide, and combinations comprising aluminum oxide and zirconium oxide.

Figure 3:
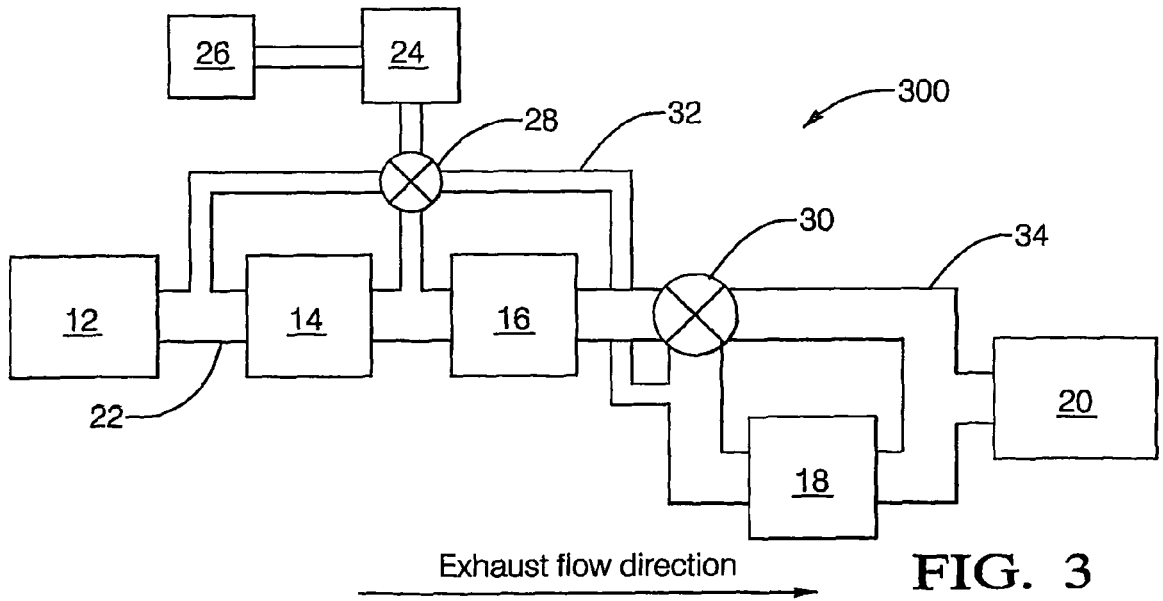
FIG. 3 is a schematic view of a second embodiment of an exemplary exhaust treatment system.
Figure 4:
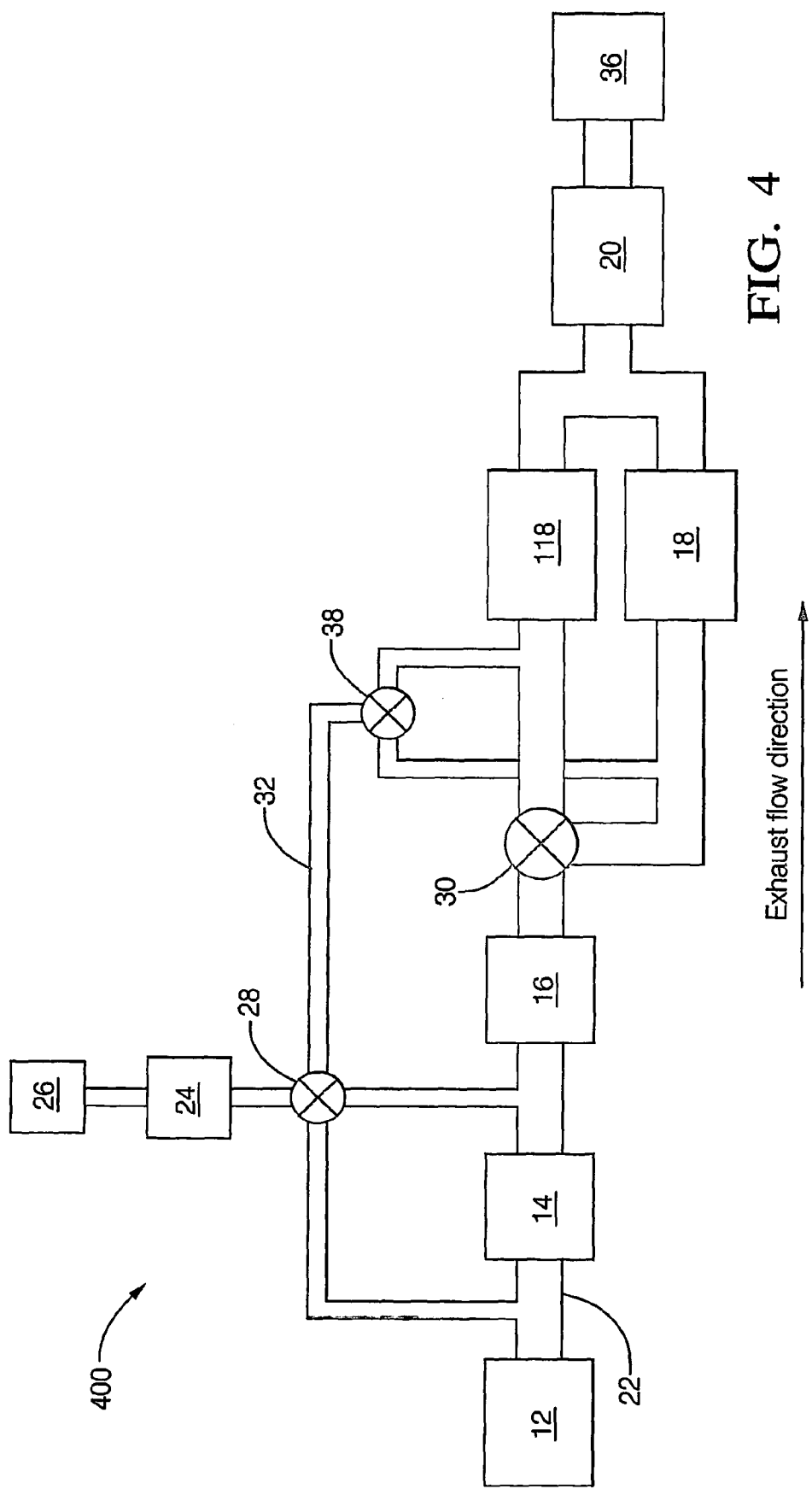
FIG. 4 is a schematic view of a third embodiment of an exemplary exhaust treatment system.

Referring now to FIG. 4, an exemplary exhaust treatment system generally designated 400 is illustrated. As briefly mentioned above, the number of components in a system may vary. In this system, two $NO_X$ adsorbers 18 are arranged in a parallel configuration with each fluid pathway merging at a SCR catalyst 20 disposed downstream. In other words, the by-pass conduit shown in FIG. 3 was replaced with and additional $NO_X$ adsorber 118. In this embodiment, fluid flow along a given pathway may be determined by valve 30, as discussed above. Similarly, reductant flow may be controlled by valve 38. Each $NO_X$ adsorber 18, 118 and SCR catalyst 20 may be regenerated as described above. More particularly, a first $NO_X$ adsorber 18 is taken "off-line", i.e., exhaust fluid is by-passed around it to the second $NO_X$ adsorber 118. At the same time, reformate (e.g., primarily hydrogen and carbon monoxide), i.e., a reductant, is then introduced into reformate conduit 32, which is in fluid communication with both first and second $NO_X$ adsorber 18, 118. Depending on which $NO_X$ adsorber 18, 118 is "off-line", valve 38 will introduce reformate to that "off-line" $NO_X$ adsorber 18, 118. The carbon monoxide reductant consumes oxygen, the air to fuel ratio decreases to less than or equal to about 12, and the reductant hydrogen reacts with $NO_X$ in the $NO_X$ adsorber 18 producing the reductant ammonia. The reductant ammonia then collects in SCR catalyst 20 located downstream from the first and the second $NO_X$ adsorber 18, wherein the SCR catalyst 20 may store the reducing agent as ammonia or ammonium hydroxide. The ammonia may than be used to react with $NO_X$ slip past $NO_X$ adsorbers 18, 118.

Examples of this reaction are as follows:

$$2NO+2NH_3+\tfrac{1}{2}O_2 \rightarrow 2N_2+3H_2O \qquad (IV)$$

$$NO+NO_2+2NH_3 \rightarrow 2N_2+3H_2O \qquad (V)$$

FIG. 4 also illustrates a second oxidation catalyst 36, which is capable of oxidizing CO and $NH_3$, disposed downstream of the SCR catalyst 20. This catalyst may be used, for example, to oxidize any carbon monoxide (CO), ammonia ($NH_3$), nitrous oxide ($N_2O$) and/or hydrogen sulfide ($H_2S$) passing through the SCR catalyst 20 into carbon dioxide ($CO_2$), nitrogen ($N_2$), sulfur dioxide ($SO_2$), and water ($H_2O$). The second oxidation catalyst 36 may comprise similar materials as discussed in relation to first oxidation catalyst 14.

In various embodiments, the second oxidation catalyst 36 may further comprise a zeolite capable of oxidizing $NH_3$, e.g., the zeolite may be present in an amount greater than or equal to about 20 wt % zeolite as a support material, based upon the total weight of the underlayer. Preferably, the zeolite is an underlayer disposed over the substrate, with a catalyst overlayer disposed over the underlayer. The zeolite underlayer can have a zeolite loading of about 0.1 g/in³ (about 0.006 g/cm³) to about 1.5 g/in³ (about 0.9 g/cm³), with about 0.25 g/in³ (about 0.02 g/cm³) to about 0.75 g/in³ (about 0.05 g/cm³) preferred. The overlayer can have catalytic metal component loading of about 1.0 g/in³ (about 0.06 g/cm³) to about 5.0 g/in³ (about 0.3 g/cm³), with about 2.5 g/in³ (about 0.15 g/cm³) to about 4.0 g/in³ (about 0.24 g/cm³).

The ratio of the zeolite to other catalytic metal materials may be about 80:20 to about 20:80. The zeolite layer is preferably catalytic metal free (i.e., catalytic metal component was not added to the zeolite prior to application to the substrate). Separating the catalytic metal composition from the zeolite helps eliminate adverse interactions between highly acidic catalyst metal solutions and the zeolite material. This separation prevents leaching of aluminum from the zeolite structure, thus improving the durability of the zeolite as well as preserving catalyst metal dispersion.

The zeolites preferably have the following characteristics: (1) capable of adsorbing hydrocarbon preferentially over water when exposed to exhaust gas streams at temperatures under cold start conditions to about 800° C.; (2) preferably have a heat of adsorption value of greater than or equal to about 9.5 kilocalories per gram (kcal/g) of hydrocarbon at about 150° C.; (3) capable of withstanding accelerated aging conditions, such as exposing a zeolite coated substrate to temperatures of about 600° C. for greater than or equal to about 50 hours on an engine dynamometer, while still retaining both its adsorption properties and its structural integrity.

The zeolite preferably has a silicon to aluminum (Si/Al) molar ratio of greater than or equal to about 12, a Na content less than or equal to about 0.1 wt. % and an average pore size (measured along the major diameter) of about 0.1 nanometer (nm) to about 1.0 nm. Zeolite types include Y-type, beta-type, ZSM-5, mordenite, ferrierite, faujisite, and the like, which can efficiently adsorb hydrocarbons having major molecular diameters of less than or equal to about 0.4 nm. Preferably, the zeolite is a Y-type zeolite such as large pore zeolite (e.g., zeolite Y, ultra stable zeolite Y, de-aluminated zeolite Y, and the like), preferably with an average pore size of about 0.3 nm to about 0.5 nm (e.g., about 0.4 nm), a silica to alumina ratio of greater than or equal to about 100, and a Na content of less than or equal to about 0.01 wt. % based on the total weight of the zeolite.

The oxidation catalyst 36 can further comprise non-zeolite support(s) in addition to the zeolite. Preferable supports include alkaline earth coated aluminum oxide, zirconium oxide, titanium oxide, and the like, as well as combinations comprising at least one of the foregoing, with titanium-zirconium solid solutions preferred. The support can also comprise a rare earth material selected from scandium, yttrium, lanthanum, cerium, praseodymium, neodymium, dysprosium, ytterbium, and the like. All or a portion of the rare earth materials can be co-deposited from solutions with the catalytic metal components. The support oxides-rare earth oxides have the catalyst metals deposited and "fixed" through calcination prior to being mixed or layered with the zeolite. Preferably, the second oxidation catalyst catalytic metal component comprises palladium, platinum, and/or rhodium, and mixtures and alloys of palladium, platinum and rhodium. Preferably, the catalytic metal component is palladium In addition to those components shown if FIG. 4, additional SCR catalyst may be added downstream of the $NO_X$ adsorber 18. Preferably, the additional SCR catalysts are arranged in a parallel configuration similar to the $NO_X$ adsorber 18. The parallel configuration allows selective regeneration of the SCR catalyst 20.

In addition to the various exhaust emission treatment devices, the system can comprise various sensor(s). For example, an oxygen sensor, a $NO_X$ sensor, and/or a $NH_3$ sensor may be located downstream of $NO_X$ adsorber 18 and/or SCR catalyst 20 to monitor $NO_X$ and $NH_3$ slip through a given system component. A temperature sensor can be disposed upstream and adjacent to the oxidation catalyst 14.

It is noted that FIGS. 3 and 4 illustrate embodiments where the source of $NO_X$ for ammonia generation is the $NO_X$ stored in the $NO_X$ adsorbers 18. As described above, the ammonia produced is then stored in the SCR catalyst 20, where it is used to reduce $NO_X$ present in the exhaust fluid. However, in other embodiments (FIGS. 5-7), the system may not comprise a $NO_X$ adsorber. In such systems, ammonia is produced "off-line", i.e., not within the exhaust fluid stream. This ammonia may then be introduced into the system via exhaust conduit 22, for example, upstream of the SCR catalyst 20, wherein the ammonia is stored in the SCR catalyst 20. The stored ammonia may then be used to react with $NO_X$ present in the exhaust fluid. The SCR catalyst 20 may be regenerated by introducing ammonia into the exhaust fluid as described herein. Regeneration may be based on factors like $NO_X$ slip, engine schedule, time, or a combination of the foregoing.

Figure 5:
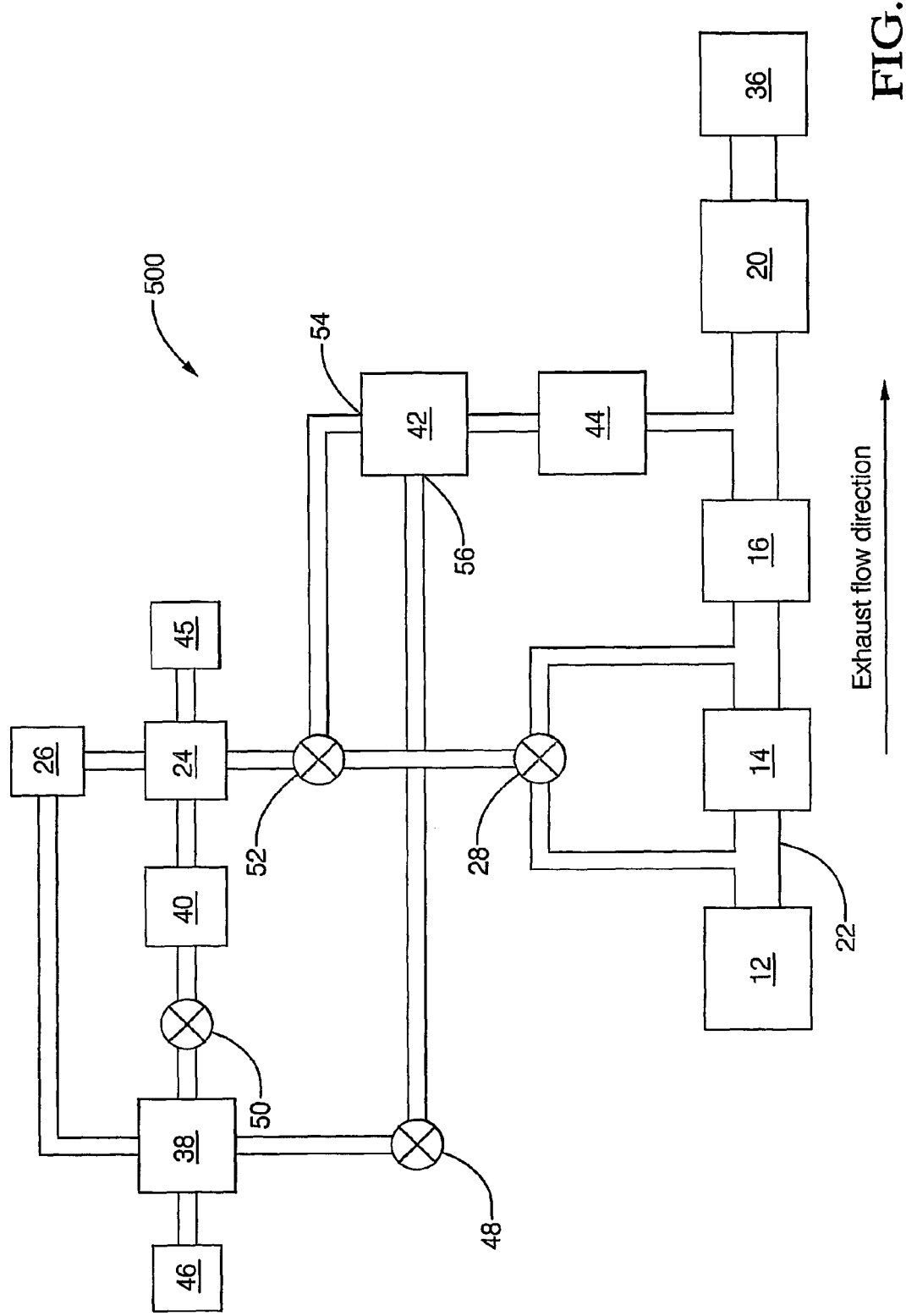
FIG. 5 is a schematic view of a fourth embodiment of an exemplary exhaust treatment system.

Referring now to FIG. 5, an exemplary exhaust treatment system generally designated 500 is illustrated. The system 500 comprises a fuel supply source 26 in fluid communication with reformer 24 and burner 38. Air source 46 is in fluid communication with burner 38. A flame arrester 40 may be disposed between burner 38 and reformer 24 (i.e., downstream of burner 38 and upstream of reformer 24). Burner 38 is in fluid communication with reformer 24 and is located upstream of and in fluid communication with mixing chamber 42. Mixing chamber 42 is located upstream of and in fluid communication with reactor 44. Within this system valves 48, 50, and 52 may be added between various components to control the fluid flow from that given component. For example, valve 48 may be disposed between burner 38 and mixing chamber 42 to control fluid flow from burner 38 to mixing chamber 42.

Burner 38 and reformer 24 are both preferably in direct fluid communication with mixing chamber 42. Additionally, reformer 24 is in selective fluid communication with oxidation catalyst 14 and particulate filter 16 via valve 28. In other words, reformate may be supplied intermittently to oxidation catalyst 14 and/or particulate filter 16 to regenerate these components, and/or reformate may be supplied to mixing chamber 42 via valve 52 to be used in the production of ammonia. Accordingly, the system offers the advantage of on-board regeneration of ammonia using an available fuel source 26, as well as selective regeneration of oxidation catalyst 14 and particulate filter 16.

The burner 38 is one where a fuel source 26 is mixed with an oxidant, e.g., air from the atmosphere through air source 46 or exhaust gas recirculation (EGR) through air source 46, and burned to produce nitrogen oxides ($NO_X$), which are then fed to the mixing chamber 42, to the reformer 24 via a flame arrestor 40, and/or are used to heat a passenger compartment prior to introduction into the exhaust conduit 22. Additionally, EGR may be fed directly to the reformer. In FIG. 5, an EGR source 45 is shown to schematically illustrate this embodiment. When EGR is used in the reformer, EGR is diverted to the off-line reformer via, for example, a valve disposed downstream of the SCR catalyst 20. It is noted that when EGR is used in the reformer, the reformer may water gas shift water present in the EGR to hydrogen. It is further noted that the EGR diluent can decrease the combustion rate, thereby reducing the reforming temperature and increasing the partial oxidation products. The burner 38 may be used for the combustion of a mixture of air and fuel in any desired ratio. It is preferable to feed the air and the fuel into the burner 38 in an air to fuel ratio of about 14 to about 70. Within this range, it is generally desirable to use an air to fuel ratio greater than or equal to about 18, preferably greater than or equal to about 22, and more preferably greater than or equal to about 30. Also desirable within this range, is an air to fuel ratio of less than or equal to about 65 preferably less than or equal to about 60, and more preferably less than or equal to about 50.

The mixing chamber 42 is a vessel having an inlet port 54 for the reformate from the reformer 24, as well as an inlet port 56 for the $NO_X$ generated in the burner 38. The mixing chamber 42 is equipped with a device and/or geometry for facilitating the mixing of the reformate with $NO_X$ such as a stirrer, baffles, and the like. The mixing chamber 42 may optionally be fitted with a cooling device to facilitate mixing and to obtain preferred catalyst operating temperatures for the fluids prior to entry into the reactor 44. In an exemplary embodiment, the mixing chamber 42 is used to facilitate the removal of any free oxygen present in the reformate and burner effluent. The free oxygen may be removed by exposure to a catalyst bed comprising metals such as iron, vanadium, ruthenium or tungsten, which are converted to metal oxides upon exposure to free oxygen.

The $NO_X$ generated in the burner 38 and the reformate generated in the reformer 24 are generally fed into the mixing chamber 42 in any desired ratio and at a temperature effective to facilitate an intimate mixing of the gases. It is generally desirable to feed the $NO_X$ and reformats into the mixing chamber 42 in a $NO_X$ to reformate ratio of about 2 to about 0.08. Within this range, it is generally desirable to have a $NO_X$ to reformate ratio of less than or equal to about 1, preferably less than or equal to about 0.5, and more preferably less than or equal to about 0.25. Also desirable within this range is a $NO_X$ to reformate ratio of greater than or equal to about 0.09, preferably greater than or equal to about 0.1, and more preferably greater than or equal to about 0.125.

The reactor 44 receives a mixture of the $NO_X$ and the reformate from the mixing chamber 42 preferably at a temperature of about 220° C. to about 400° C. The reactor 44 comprises a metal shell around an ammonia forming catalyst that facilitates a reaction between $NO_X$ and the hydrogen to yield ammonia. The ammonia forming catalyst metal is loaded on a catalytic metal support, or "washcoat". The ammonia forming catalyst can be a type that stores either the reformate generated in the reformer 24 until $NO_X$ is available or it could store the $NO_X$ generated from the burner 38 until the reformate is available. It is, however, desirable to use an ammonia forming catalyst that stores $NO_X$ until the reformate is available, since a lower volume of catalyst is used for $NO_X$ storage and the ensuing reaction.

In various embodiments, reactor 44, shown in FIG. 5 for example, may be a three-way conversion catalyst. It is noted that a three-way conversion catalyst has typically been used to oxidize hydrocarbons and carbon monoxide, and reduce $NO_X$. The term "three-way" is not being used herein to describe the function of a catalyst to treat hydrocarbons, carbon monoxide, and $NO_X$, but rather to describe the catalyst itself. In other words, the three-way conversion catalyst may be referred simply as a reactor capable of producing ammonia. However, it is noted if the three-way catalyst disclosed herein were disposed in-line, it could also be used to treat hydrocarbons, carbon monoxide, and $NO_X$.

The reactor 44 generally comprises a substrate, a catalyst metal(s), and catalyst support material, which may be similar to the relating elements of the various exhaust treatment devices discussed above. For example, the catalyst metal support may comprise refractory oxides such as aluminum oxides, stabilized aluminum oxides such as barium stabilized aluminum oxide, zirconium, yttrium oxide rare earth oxides such as cerium, lanthanum praseodymium, neodymium or ytterbium oxide, transition metal oxides such as nickel, manganese, cobalt copper or iron oxide and engineered materials such as zeolites, as well as mixtures such as cerium-zirconium solid solutions and the like.

The reactor 44 may further comprise $NO_X$ adsorbing elements such as barium oxide and/or cesium oxide in an amount of about 2 to about 12 wt %, based on the total weight of the catalytic metal and catalytic metal supports. The catalyst metal generally comprises a precious metal such as platinum, palladium, rhodium, ruthenium, and the like, as well as combinations comprising at least one of the foregoing metals. In an exemplary embodiment, the ruthenium may be present in a loading of about 0.11 g/in$^3$ (about 0.007 g/cm$^3$) to about 0.40 g/in$^3$ (about 0.02 g/cm$^3$) while the platinum, palladium or rhodium may be present in loading of about 0.011 g/in$^3$ (about 0.0007 g/cm$^3$) to about 0.046 g/in$^3$ (about 0.003 g/cm$^3$).

Preferably, the catalytic metal(s) of the reactor 44 comprises a combination of ruthenium with other metals. The other metals, e.g., rhodium, and the like, can be present in an amount less than the ruthenium. In the case of a ruthenium-rhodium combination, the precious metal component can comprise up to about 99 wt % ruthenium and up to about 4.0 wt % rhodium, based on the total weight of the catalytic metal component. Within this range, greater than or equal to about 0.2 wt % of rhodium is preferred, with greater than or equal to about 1.0 wt % rhodium more preferred. Also within this range, less than or equal to about 2.0 wt % of rhodium is preferred, with less than or equal to 1.2 wt % rhodium more preferred.

In an exemplary embodiment related to the functioning of the reactor 44, any traces of free oxygen present in the reactor 44 are first removed according to the reaction (VI). This reaction generally occurs before any $NO_X$ is reduced:

$$H_2+CO+O_2 \rightarrow CO_2+H_2O \quad (VI)$$

Following the removal of oxygen, ammonia can be formed by reducing $NO_X$ according to the following reactions (VII) and (VIII):

$$5H_2+2NO \rightarrow 2NH_3+2H_2O \quad (VII)$$

$$7H_2+2NO_2 \rightarrow 2NH_3+4H_2O \quad (VIII)$$

From the reactions (VII) and (VIII) it may be seen that 1 mole of either NO or $NO_2$ is used to generate 1 mole of ammonia. If the hydrogen reducing atmosphere is not present in the appropriate quantities as represented by the reactions (VII) and (VIII) respectively, partially reduced species can also form according to the reactions (IX) and (X):

$$H_2+2NO \rightarrow N_2O+H_2O \quad (IX)$$

$$3H_2+2NO_2 \rightarrow N_2O+3H_2O \quad (X)$$

These partially reduced species are undesirable, and in order to prevent their formation, it is preferred to use an excess of hydrogen to facilitate the conversion of ($NO_X$) according to the reactions (XI) and (XII):

$$6H_2+2NO \rightarrow 2NH_3+2H_2O+H_2 \quad (XI)$$

$$8H_2+2NO_2 \rightarrow 2NH_3+4H_2O+H_2 \quad (XII)$$

From reactions (XI) and (XII), it may be seen that if the $NO_X$ is 100% NO, then about 3 moles of $H_2$ are used to convert every mole of NO to ammonia. If the $NO_X$ is 100% $NO_2$, then about 4 moles of $H_2$ are used to convert every mole of $NO_2$ to ammonia. Since the $NO_X$ from the burner 38 is usually a mixture of NO and $NO_2$, it is generally desirable to use an amount of about 3 to about 4 moles of $H_2$ to facilitate the conversion to ammonia. If less than 4 moles of $H_2$ is used, however, a portion of the $NO_X$ may pass through the exhaust system without being converted to ammonia. This is generally termed "$NO_X$ slip". In order to prevent such $NO_X$ slip, it is preferable to use an amount of greater than or equal to about 4 moles of $H_2$ per mole of $NO_X$.

The conditions within the reactor 44 are preferably controlled to have a temperature and pressure effective to facilitate the ammonia producing reaction. The reaction to produce ammonia in the reactor 44 generally occurs at a temperature of about 120° C. to about 400° C. Within this range, it is generally desirable to conduct the reaction at a temperature of greater than or equal to about 180° C., preferably greater than or equal to about 220° C., and more preferably greater than or equal to about 240° C. Also desirable within this range, is a temperature of less than or equal to about 400° C., preferably less than or equal to about 320° C., and more preferably less than or equal to about 280° C. The pressure is generally about 15 kilopascals (kPa) to about 150 kPa. Within this range, it is generally desirable to conduct the reaction at a pressure of greater than or equal to about 30 kPa, preferably greater than or equal to about 45 kPa, and more preferably greater than or equal to about 60 kPa. Also desirable within this range is a pressure of less than or equal to about 150 kPa, preferably less than or equal to about 120 kPa, and more preferably less than or equal to about 90 kPa.

Ammonia produced in reactor 44 may be introduced upstream of SCR catalyst 20. As described above, the ammonia may be stored in the SCR catalyst. The $NO_X$ in the exhaust stream generally reacts with the stored ammonia in SCR catalyst 20. In an exemplary embodiment, it is generally desirable to maintain the SCR catalyst 20 at a temperature of less than or equal to about 480° C. This generally prevents the decomposition of ammonia to form nitrogen oxides, which are undesirable.

Figure 6:
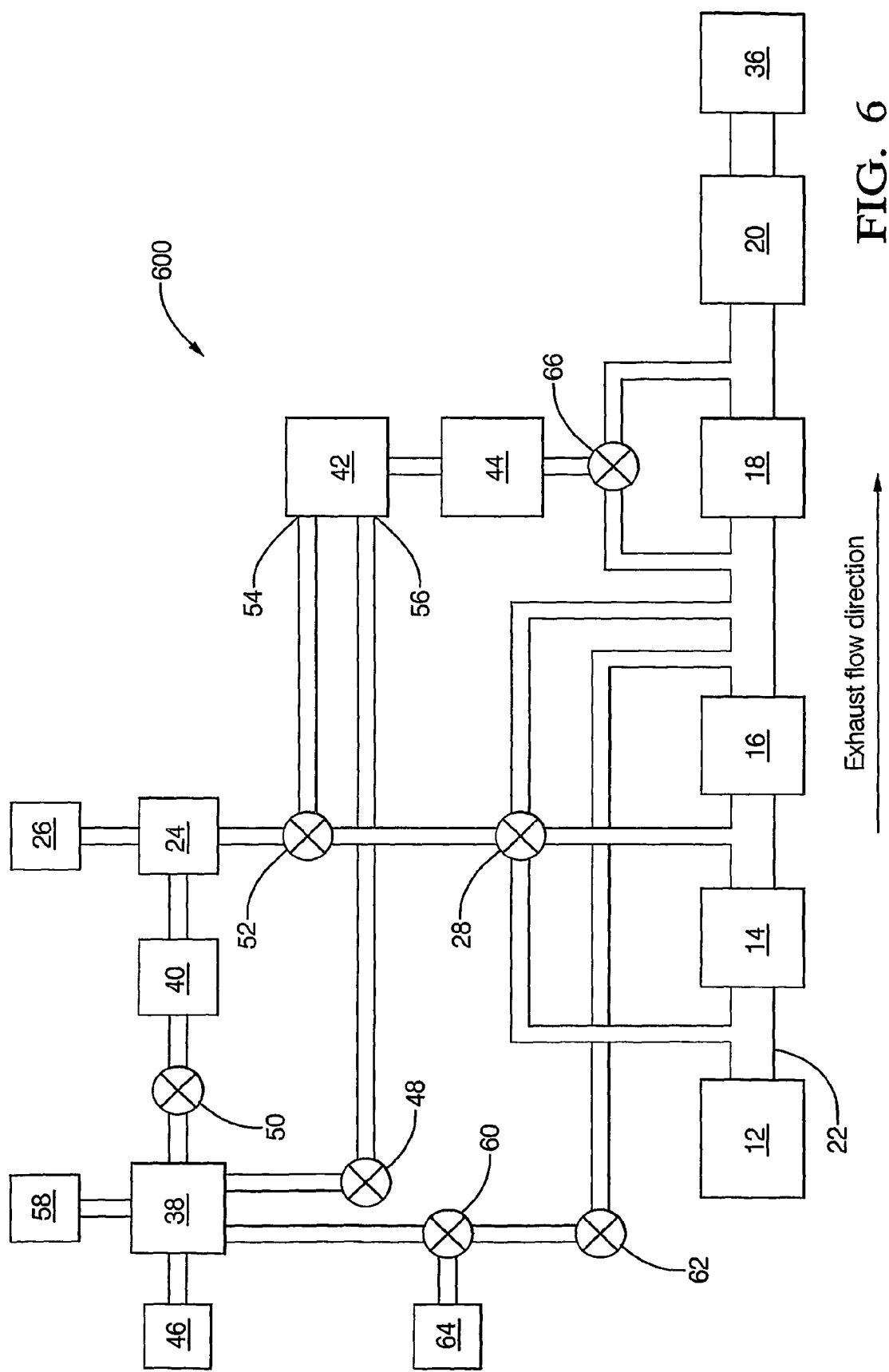
FIG. 6 is a schematic view of a fifth embodiment of an exemplary exhaust treatment system.

Referring now to FIG. 6, an exemplary exhaust treatment system generally designated 600 is illustrated. FIG. 6 is included to illustrate various additional embodiments envisioned. For example, a second fuel source 58 may be included in the system 600 in fluid communication with burner 38. As such, second fuel source may employ substantially the same fuel as fuel source 26 or alternatively it may employ a different fuel. Examples of the fuel source 58 include hydrocarbon fuels such as gasoline, diesel, ethanol, methanol, kerosene, and the like; gaseous fuels, such as natural fluid, propane, butane, and the like; and alternative fuels, such as hydrogen, biofuels, dimethyl ether, and the like; and the like, as well as combinations comprising at least one of the foregoing fuels. The selection of fuel source 58 is based upon application, expense, availability, and environmental issues relating to the fuel source 58. The preferred fuel source is diesel. Alternatively to the additional fuel source 58, fuel source 26 could be disposed in fluid communication with the burner 38.

FIG. 6 further illustrates schematically that heat generated from burner 38 may be used in a heating device 64 for heating a passenger compartment of a vehicle. Valves 60 and 62 may be disposed in fluid communication with burner 38 to regulate flow of fluid from burner 38. The fluid from the burner comprising $NO_X$ may be diverter to heating device 64 via valve 60, wherein the fluid may then be deposited in exhaust conduit 22 upstream of SCR catalyst 20, or into the reactor 44 via the optional mixing chamber 42. Preferably, the fluid (effluent) from burner may be disposed upstream of $NO_X$ adsorber 18, which is in direct fluid communication with SCR catalyst 20. Alternatively, the fluid from burner 38 may be diverted to mixing chamber 42 via valve 48. Optional mixing chamber 42 is disposed upstream and in fluid communication with reactor 44. Accordingly, as discussed above, the $NO_X$ from the burner may be used to produce ammonia in the reactor 44. Additionally, the burner effluent may be diverted to the reformer 24 via valve 50 and a flame arrestor 40. The reformate exiting the reformer 24 may be disposed upstream of oxidation catalyst 14, diesel particulate filter 16, $NO_X$ adsorber 18, and/or SCR catalyst 20. Preferably, the reformate is selectively disposed via valve 28 directly before oxidation catalyst 14 into exhaust conduit 22, directly before particulate filter 16 into exhaust conduit 22, or directly before $NO_X$ adsorber 18 into exhaust conduit 22.

Additionally, in other embodiments, a $NO_X$ adsorber 18 may be disposed in fluid communication with reactor 44. Preferably, the $NO_X$ adsorber 18 is disposed upstream of the SCR catalyst 20 in direct fluid communication with the SCR catalyst 20. Valve 66 is in fluid communication with reactor 44 to selectively control fluid flow from reactor 44 to $NO_X$ adsorber 18 and/or SCR catalyst 20. In addition to the configurations illustrated individually in FIGS. 1-5, combinations of these embodiments are also envisioned. For example, additional $NO_X$ adsorber 118 may be included in parallel, or series within the system.

In an exemplary embodiment, engine 12 is in direct fluid communication with and disposed upstream of oxidation catalyst 14; oxidation catalyst 14 is in direct fluid communication with and disposed upstream of particulate filter 16; particulate filter 16 is in direct fluid communication with and disposed upstream of $NO_X$ adsorber 18; $NO_X$ adsorber 18 is in direct fluid communication with and disposed upstream of SCR catalyst 20; and SCR catalyst 20 is in direct fluid communication with and disposed upstream of second oxidation catalyst 36. In other words, engine 12 is in serial fluid communication with, oxidation catalyst 14, particulate filter 16, $NO_X$ adsorber 18, and SCR catalyst 20.

Figure 7:
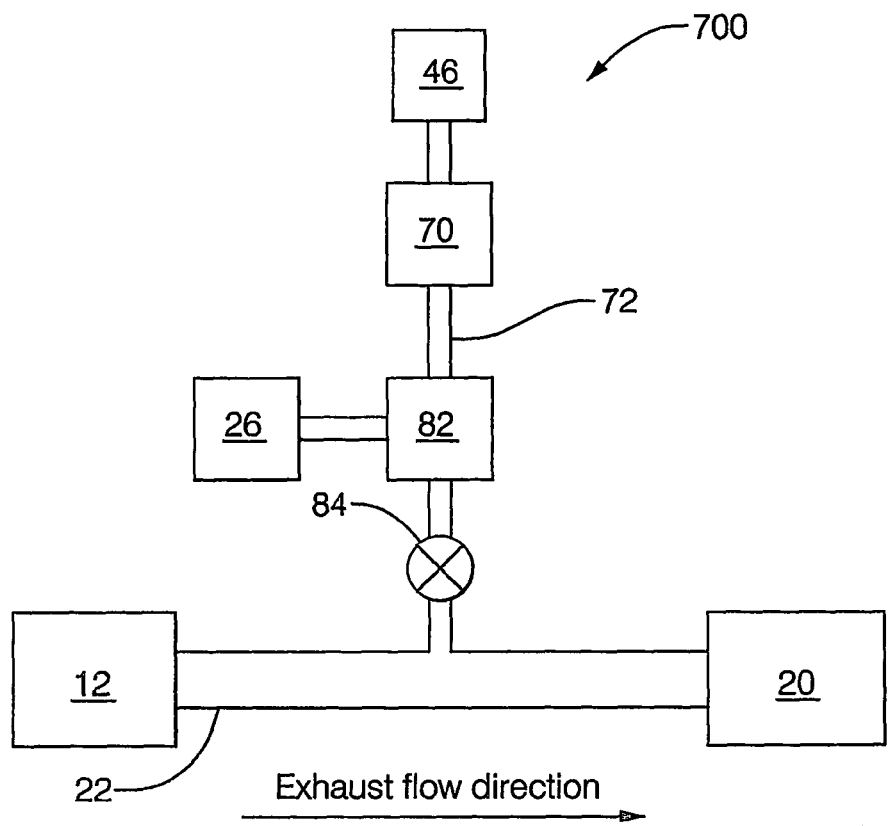
FIG. 7 is a schematic view of a sixth embodiment of an exemplary exhaust treatment system.

FIG. 7 is a schematic illustration of an exhaust treatment system generally designated 700. This figure is included to illustrate yet another method of on-board generation of ammonia. This embodiment is similar to those illustrated in FIGS. 5 and 6 in that efforts are made to generate $NO_X$ off-line for the purposes of using the $NO_X$ to produce ammonia. As will be discussed in greater detail, this system illustrates an embodiment where fuel, e.g., diesel fuel is "nitrogenized" prior to entering a reformer. This nitrogen enriched fuel may be used to produce high levels of $NO_X$ and/or high levels of ammonia. The term "high" as used in relation to this embodiment relates to $NO_X$ and/or ammonia concentration of greater than or equal to about 1,000 parts per million (ppm), with greater than 2,000 ppm preferred, wherein the parts per million is a volumetric percentage.

In comparison, a diesel engine 12 generally produces $NO_X$ in a concentration of less than or equal to about 10 ppm. This type of $NO_X$ may generally be characterized as "fuel $NO_X$". The term "fuel $NO_X$" as used herein refers to $NO_X$ released from fuel when it is burned, i.e., the $NO_X$ released may also be a function of the fuel type used. For example, biomass may have a higher nitrogen content compared to diesel fuel, as such a greater volume of $NO_X$ would comparatively be generated from the biomass than diesel fuel. The term "thermal $NO_X$" as used herein generally refers to $NO_X$ generated as a result of operating temperatures, e.g., temperatures greater than or equal to about 900° C., i.e., nitrogen in the air reacts with oxygen to form $NO_X$. Thermal $NO_X$ may be produced in a concentration of less than or equal to about 1000 ppm, with about less than or equal to about 400 ppm common. Additionally, $NO_X$ may be characterized as "prompt $NO_X$". The term "prompt $NO_X$" is used herein to describe the interaction of atmospheric nitrogen and carbon in the fuel. Accordingly, a fuel may be purposely "nitrogenized", i.e., nitrogen is added to the fuel, to increase the $NO_X$ produced in the system. Prompt $NO_X$ may be produced in an amount less than or equal to about 10 ppm.

In the system 700, air from air source 46 is introduced into permeable membrane 70, wherein the membrane is capable of inhibiting passage of oxygen, thereby producing a ratio of oxygen to nitrogen in an output stream 72 of the permeable membrane 70. Generally, air comprises about 21 volume percent (vol %) oxygen, and about 79 vol % nitrogen. The output stream preferably comprises about 5 vol % oxygen to about 10 vol % oxygen and about 90 vol % nitrogen to about 95 vol % nitrogen. As such, a volume ratio of oxygen to nitrogen is preferably about 1:9 to about 1:19.

Referring now to FIG. 7, the system 700 comprises a permeable membrane 70 in direct fluid communication with a reformer 82. The oxygen to nitrogen ratio is controlled by the permeable membrane 70 as discussed above and introduced into reformer 82. Reformer 82 is capable of mixing the output stream 72 of permeable membrane 70 with fuel from fuel source 26. The reformer 82 is designed to withstand operating conditions favorable for the production of ammonia from the fuel source. For example, the operating pressure is sufficient to produce ammonia at the operating temperature. The pressure may be less than or equal to about 100 atmosphere, with an operating pressure of about 20 atmosphere to 40 atmosphere generally employed. An operating temperature of the reformer 82 is sufficient to produce ammonia at the operating pressure, and preferably less than or equal to about 300° C. Ammonia produced in reformer 82 may be disposed upstream of SCR catalyst 20 via valve 84. Advantageously, valve 84 is capable of selectively controlling fluid communication between reformer 82 and SCR catalyst 20. As such, ammonia may be intermittently introduced into SCR catalyst 20 to regenerate the SCR catalyst 20.

Reformer 82 may comprise a catalytic metal component, support material, and substrate. This reformer 82 may have an optional mixing chamber coupled to it and is preferably encased in a pressure controlled container. The mixing chamber allows the air from permeable membrane 70 and the fuel from fuel source 26 to mix prior to entering the reformer 82. Additionally, reformer 82 comprises catalyst materials, support materials substantially the same as reformer 24. Preferably, in various embodiments reformer 82 comprises an iron oxide catalyst metal and/or osmium.

In various embodiments disclosed herein, the system does not comprise a $NO_X$ adsorber(s), which may be used to trap $NO_X$ during lean operating conditions, i.e., when the air-to-fuel ratio is greater than the balanced combustion stoichiometry. For example, the air-to-fuel ratio is greater than about 14.7 and may be between about 19 to about 35. While $NO_X$ may not be trapped and later reduced, $NO_X$ present in an exhaust fluid may be reduced to nitrogen using ammonia stored on the SCR catalyst as discussed above. Conversion of greater than or equal to about 90% of the $NO_X$ present in the exhaust fluid to nitrogen may be obtained, with greater than about 95% preferred, wherein the percents used herein refer to volumetric percentages. These high conversions of $NO_X$ may be obtained by regulating a ratio of NO to $NO_2$ in the exhaust fluid. Preferably, the ratio of NO to $NO_2$ in the exhaust fluid is about 1:0.6 to about 1:1.5, with a ratio of about 1:1 especially preferred. As such, a portion of NO may be converted to $NO_2$ in order to obtain the desired ratio, e.g., 1:1. In an exemplary embodiment, a non-thermal plasma (NTP) reactor(s) may be used to convert a portion of NO to $NO_2$.

The NTP reactor can comprise several kinds of configurations, including an electrified packed bed reactor, a glow-discharge plasma reactor, a corona discharge reactor, a RF discharge reactor, a pulsed corona reactor, a dielectric-barrier discharge reactor, surface discharge reactor, or the like, as well as combinations comprising at least one of these types of reactors. A non-thermal plasma can be generated by several methods, such as electrical fields, electron beams, and irradiation with electromagnetic energy of appropriate intensity and wavelength, with generation by electrical fields desirable. Preferably, a flat plate dielectric barrier type reactor is used. Exemplary non-thermal plasma reactors are disclosed, for example, in U.S. Patent Publication Nos. 20030182930 A1 to Goulette et al., and 20030150709 A1 to LaBarge et al., U.S. Pat. Nos. 6,423,190, 6,464,945, and 6,482,368 to Hemingway et al., and U.S. Pat. No. 6,638,484 to Nelson et al., which are incorporated herein by reference.

In order to attain the desired $NO_2$ yield from the non-thermal plasma reactor, the power to the reactor, the electric field strength, and/or the temperature of the incoming gases can be controlled. The non-thermal plasma reactor may be controlled by varying the power applied to the incoming gasses (e.g., measured in joules/liter). In addition to the power, the electrical field strength within the discharge zone of the reactor can be controlled. Additionally, the temperature of the incoming gasses from the reformer is preferably about 100° C. to about 600° C.

Advantageously, a non-thermal plasma reactor is capable of obtaining a NO to $NO_2$ ratio of about 1:0.6 to about 1:1.5 at temperatures below 200° C. Types of non-thermal plasma reactors may include but are not limited to, a dielectric barrier or silent discharge type, a pulsed corona reactor, packed bed reactor such as a ferroelectric bed reactor, and a surface discharge reactor.

In this exemplary embodiment where the NO to $NO_2$ is about 1:1, the reactions within the SCR catalyst may be characterized by the following equations:

$$5H_2 + 2NO \rightarrow 2NH_3 + 2H_2O \qquad (XIII)$$

$$4NH_3 + 4NO_2 \rightarrow 4N_2 + 6H_2O + O_2 \qquad (XIV)$$

Figure 8:
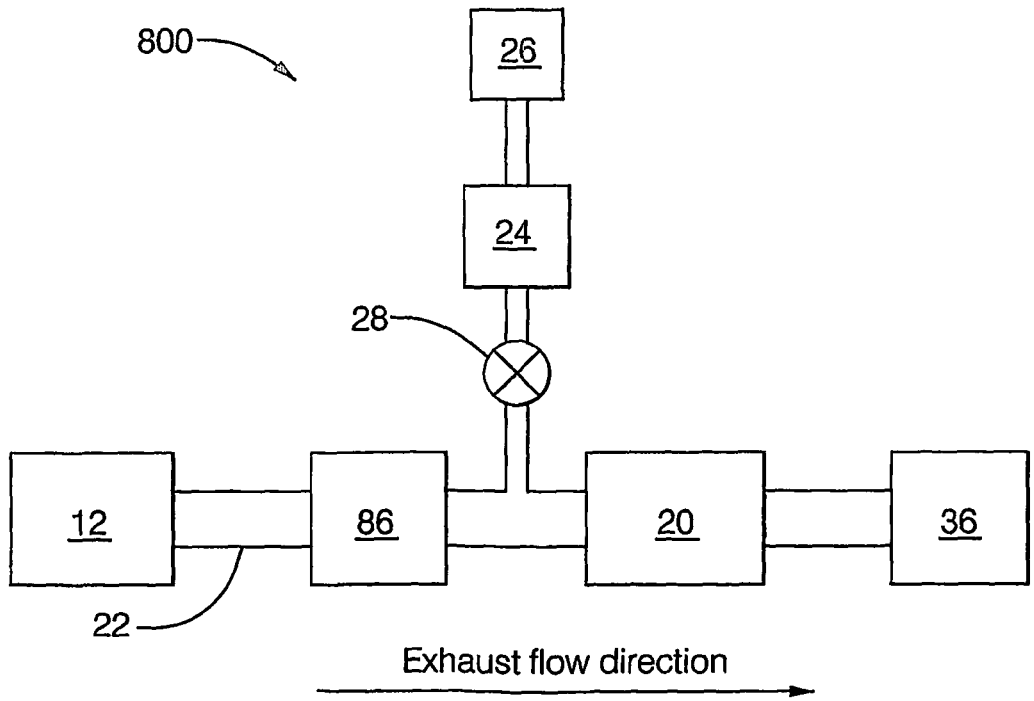
FIG. 8 is a schematic view of a seventh embodiment of an exemplary exhaust treatment system.

Turning now to FIG. 8, an exemplary exhaust treatment system generally designated 800 is illustrated. The system 800 comprises a non-thermal plasma reactor 86 disposed in fluid communication with engine 12. SCR catalyst 20 is disposed in fluid communication with and down stream of non-thermal plasma reactor 86. A reformer 24 is in selective fluid communication with SCR catalyst 20. Reformate from the reformer comprising hydrogen may be used to regenerate the SCR catalyst 20. Various other embodiments are envisioned, as discussed throughout, wherein ammonia is produced to regenerate the SCR catalyst 20.

In operation, an exemplary method of treating an exhaust fluid, may comprise, e.g., introducing an exhaust fluid to an oxidation catalyst 12. The oxidation catalyst is capable of partially oxidizing greater than or equal to 60 vol. % hydrocarbon present in an exhaust fluid, with greater than or equal to about 75 vol. % preferred, with greater than about 85% more preferred, and greater than or equal to about 95 vol. % even more preferred. Traditionally, an oxidation catalyst has been used to fully oxidize greater than or equal to 99 vol. % hydrocarbons in an exhaust stream entering the oxidation catalyst. In other words, the oxidation catalyst disclosed herein preferably acts to partially oxidize hydrocarbons, whereas traditional oxidation catalysts act to fully oxidize hydrocarbons. This oxidation catalyst, for example, can comprise a honeycomb substrate with about 300 to about 500 cells/in². On the substrate is an acidic, solid solution support with a catalyst comprising precious metal(s), wherein a catalyst comprising ruthenium is preferred. The solid solution can be a titanium-zirconium solution.

The exhaust fluid may then be introduced to a particulate filter 16. Preferably, the particulate filter comprises a WGS catalyst that may be used to convert carbon monoxide and water into hydrogen and carbon dioxide, thereby increasing the amount of reducing agents present in the exhaust fluid. Traditionally, the catalyst employed in a particulate filter has been used primarily as a traditional oxidation catalyst (e.g., to fully oxidize hydrocarbons). For example, in a traditional catalytic particulate filter, an exhaust stream comprising about 20 vol. % hydrogen entering the filter will have about 12 vol. % volume percent hydrogen exiting the filter based upon the total volume of the exhaust stream. In contrast, all else being equal, a WGS particulate filter as disclosed herein maintains (e.g., within ±2 vol. %) or increases the hydrogen concentration of the stream, e.g., preferably has greater than or equal to about 20 vol. % hydrogen exiting the filter, with greater than or equal to 22 vol. % preferred, with greater than or equal to about 26 vol. % more preferred, based upon the total volume of the exhaust stream.

The exhaust stream from the particulate filter (i.e., filter effluent) may then be introduced to a $NO_X$ adsorber 18. Under the operating conditions disclosed herein the $NO_X$ adsorber 18 may be used to produce greater than or equal to about 5,000 ppm $NH_3$ (e.g., about 1 vol. %) based upon the total volume of the $NO_X$ effluent, with greater than or equal to about 10,000 ppm preferred. In contrast to the present adsorber, a traditional $NO_X$ adsorber generally produces less than or equal to 5 ppm $NH_3$, when hydrocarbons are directly injected into the exhaust stream. The $NO_X$ adsorber 18 preferably comprises a basic support, e.g., a basic solid solution on an about 900 to about 1,300 cells/in² substrate, preferably comprising corderite, with a protective coating (e.g., phosphate(s)) between the substrate and the catalyst metal composition. For example an alkaline earth solid solution (e.g., barium oxide-zirconium solid solution) optionally with some alumina (e.g., about 2 to about 3 wt % alumina, based upon the total weight of the support), can be employed.

The ammonia produced may then be stored in the SCR catalyst 20 stores ammonia and selectively reacts the stored ammonia species with $NO_X$ in the exhaust stream The SCR catalyst 20, for example, can have a substrate comprising a ceria or tungsten. Here the support is acidic to enable the adsorption of the $NH_3$. Therefore, an acidic solid solution is preferred, such as a zirconium-titanium solid solution. A possible catalyst disposed on the support is palladium-ruthenium.

Advantageously, each and every embodiment disclosed herein allows for on-board generation of ammonia. For example, in one exemplary embodiment, $NO_X$ trapped in $NO_X$ adsorber may be used to generate ammonia, while regenerating the $NO_X$ adsorber(s). The ammonia generated may then be used to regenerate the SCR catalyst(s) and reduce $NO_X$ in the exhaust fluid that is diverted around the $NO_X$ adsorber during the regeneration phase.

Depending on the particular system architecture, the system may include an optional heat exchanger (not shown) to reduce the reformate temperature.

The heated reformate can be used to regenerate catalysts, e.g., vaporize the oil derived metal phosphate glaze(s) and re-disperse the catalytic metals. For example, in system 100, valve 28 is opened allowing hydrogen and carbon monoxide from the reformer 24 to be fed directly to the exhaust fluid stream entering the oxidation catalyst 14, and particulate trap 16. For example, organometallic zinc and calcium phosphates (e.g., zinc dialkylphosphate (ZDP)) vaporized from engine oil are deposited as diffusion limiting "glassy" phases, e.g., $CaPO_4$, $Zn_3(PO_4)_2$, $Ca_2P_2O_6$, $Ca_2P_2O_7$, $Ca(PO_3)_2$, $Zn_2P_2O_7$, mixed $CaZnP_2O_6$, and the like. These dense glass phases deposited over the catalysts, and in the particulate trap pores. Hydrogen and carbon monoxide reducing agents in the presence of steam and/or hydroxyl radicals vaporize the glassy phases. The vaporized phosphate "glazes" can be re-deposited downstream as innocuous particulate phosphates (e.g., non-glassy).

The systems disclosed herein apply a different philosophy to attain a low emissions exhaust gas, particularly in a diesel engine exhaust. These systems do not attempt to attain complete oxidation of the various exhaust gas constituents at each stage of the system. To the contrary, the components are designed to partially oxidize the various constituents so that the partially oxidized constituent can be employed downstream in another treatment device, thereby enhancing the overall removal of contaminants from the exhaust stream. An advantage of seeking partial oxidation is that the desired efficiency of the various catalysts and the amount of various precious metals employed are both reduced. These systems employ ammonia in $NO_X$ reduction, while, in other systems, e.g., a typical converters (i.e., three-way, oxidation, particulate trap oxidation and $NO_X$ adsorbers), any ammonia in a stream would be rapidly oxidized to water and primarily $N_2O$, with small amounts of $NO_2$ and NO. Previously, ammonia would not intentionally be formed from the $NO_X$ (e.g., $NO_X$ stored in a $NO_X$ adsorber), and would not be used as taught herein.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A $NO_x$ abatement system comprising:
   a heat engine including an in-line series exhaust conduit;
   a selective catalytic reduction (SCR) catalyst being disposed downstream from said heat engine in said exhaust conduit, the exhaust conduit including a fluid exhaust flow having a flow direction defined from the heat engine towards, and through said SCR catalyst, said SCR catalyst adapted for storing ammonia;
   a first oxidation catalyst disposed in said exhaust conduit intermediate said engine and said SCR catalyst;
   a particulate filter disposed in said exhaust conduit intermediate said first oxidation catalyst and said SCR catalyst;
   an off-line reactor having an output in direct fluid communication with said exhaust conduit intermediate said particulate filter and said SCR catalyst;
   a mixing chamber having an output in direct fluid communication with said off-line reactor;
   an off-line reformer having an output in direct fluid communication with said mixing chamber and in direct fluid communication with said exhaust conduit intermediate said heat engine and said first oxidation catalyst and in direct fluid communication with said exhaust conduit intermediate said first oxidation catalyst and said particulate filter;
   an off-line burner having a first and a second output, said first output being in downstream fluid communication with said reformer and said second output being direct fluid communication with said mixing chamber; and
   a second oxidation catalyst disposed in said exhaust conduit downstream of, and in fluid communication with said SCR catalyst.

* * * * *